(12) United States Patent
Helmer et al.

(10) Patent No.: US 11,163,365 B2
(45) Date of Patent: Nov. 2, 2021

(54) VIBRO-TACTILE FEEDBACK METHOD AND DEVICE

(71) Applicant: Force Dimension Sarl, Nyon (CH)

(72) Inventors: Patrick Helmer, Bernex (CH); Francois Conti, Aubonne (CH); Sébastien Grange, Lausanne (CH); Patrice Rouiller, Trélex (CH)

(73) Assignee: Force Dimension Sarl, Nyon (CH)

( * ) Notice: Subject to any disclaimer, the term of this patent is extended or adjusted under 35 U.S.C. 154(b) by 0 days.

(21) Appl. No.: 16/646,671

(22) PCT Filed: Sep. 17, 2018

(86) PCT No.: PCT/EP2018/075103
§ 371 (c)(1),
(2) Date: Mar. 12, 2020

(87) PCT Pub. No.: WO2019/053273
PCT Pub. Date: Mar. 21, 2019

(65) Prior Publication Data
US 2020/0409460 A1    Dec. 31, 2020

(30) Foreign Application Priority Data

Sep. 15, 2017  (EP) .................................... 17191501

(51) Int. Cl.
*G06F 3/16*         (2006.01)
*G06F 3/01*         (2006.01)
*A63F 13/285*       (2014.01)

(52) U.S. Cl.
CPC .............. *G06F 3/016* (2013.01); *G06F 3/16* (2013.01); *A63F 13/285* (2014.09); *A63F 2300/1037* (2013.01); *G06F 2203/013* (2013.01); *G06F 2203/015* (2013.01)

(58) Field of Classification Search
CPC ...... G06F 3/016; G06F 3/16; G06F 2203/013; G06F 2203/015; A63F 13/285; A63F 2300/1037
See application file for complete search history.

(56) References Cited

U.S. PATENT DOCUMENTS

| | | | |
|---|---|---|---|
| 2003/0067440 A1* | 4/2003 | Rank | A63F 13/5255 345/156 |
| 2012/0206247 A1 | 8/2012 | Bhatia et al. | |
| 2019/0015169 A1* | 1/2019 | Verner | A61B 34/35 |

FOREIGN PATENT DOCUMENTS

| | | | |
|---|---|---|---|
| EP | 2873447 A1 | 5/2015 | |
| WO | WO 2003/032289 A1 | 4/2003 | |

OTHER PUBLICATIONS

International Search Report and Written Opinion dated Nov. 22, 2018 for International Application No. PCT/EP2018/075103, 11 pages.

* cited by examiner

*Primary Examiner* — Lisa S Landis
(74) *Attorney, Agent, or Firm* — Frost Brown Todd LLC

(57) ABSTRACT

Method of providing vibro-tactile feedback to a user of a user interface device comprising at least one actuator adapted to provide vibro-tactile feedback to the user and communicatively coupled to an application device, a vibro-tactile feedback providing device and vibro-tactile feedback providing system as well as a computer program product for carry out said method.

17 Claims, 20 Drawing Sheets

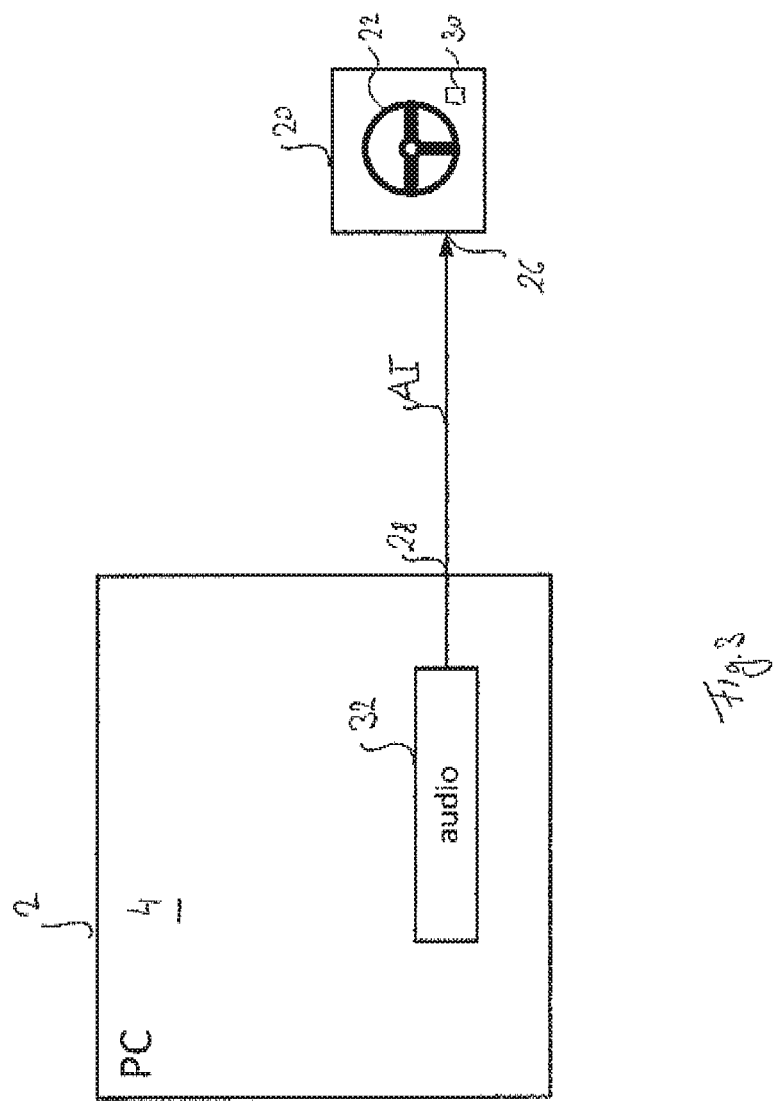

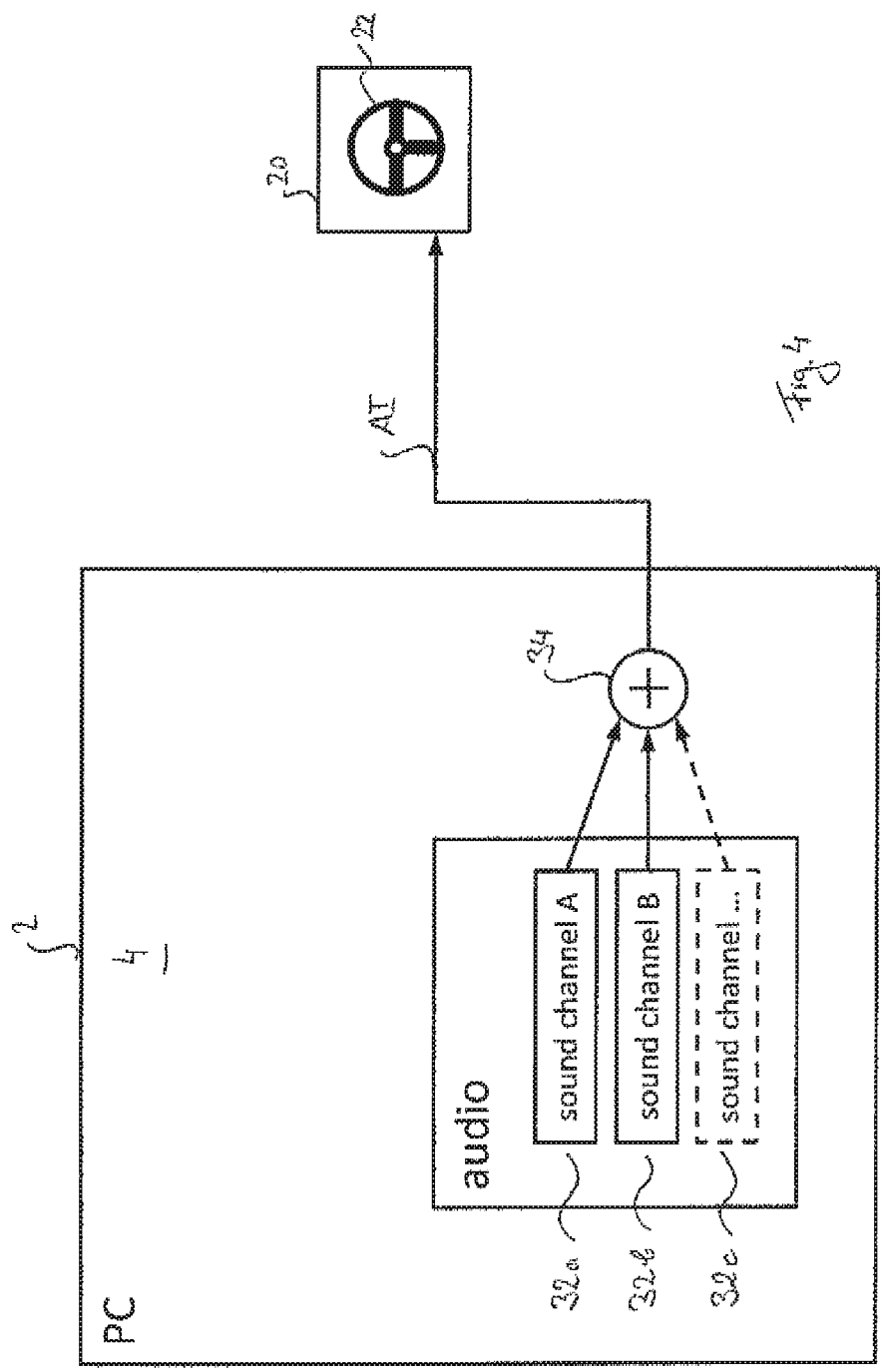

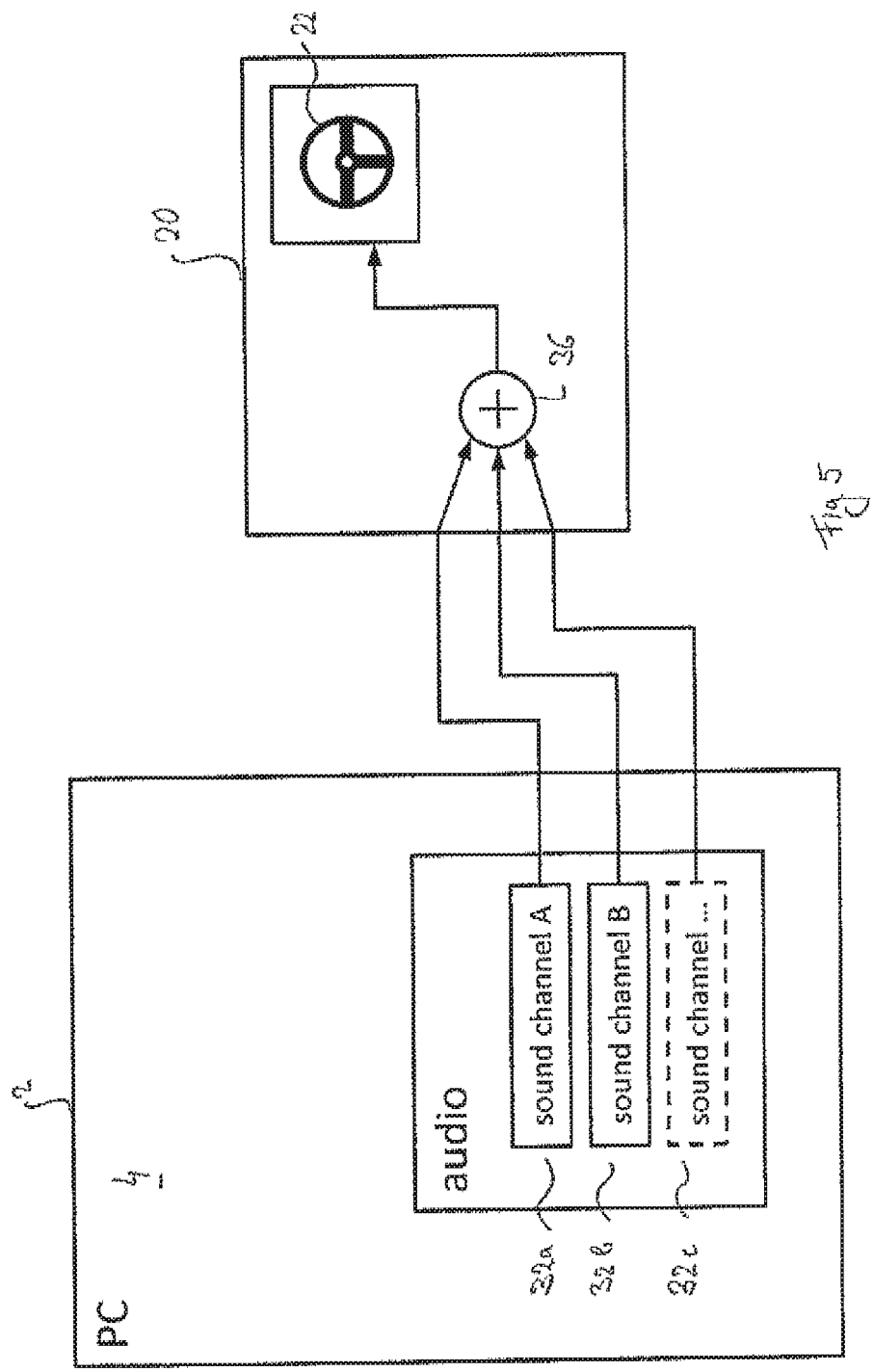

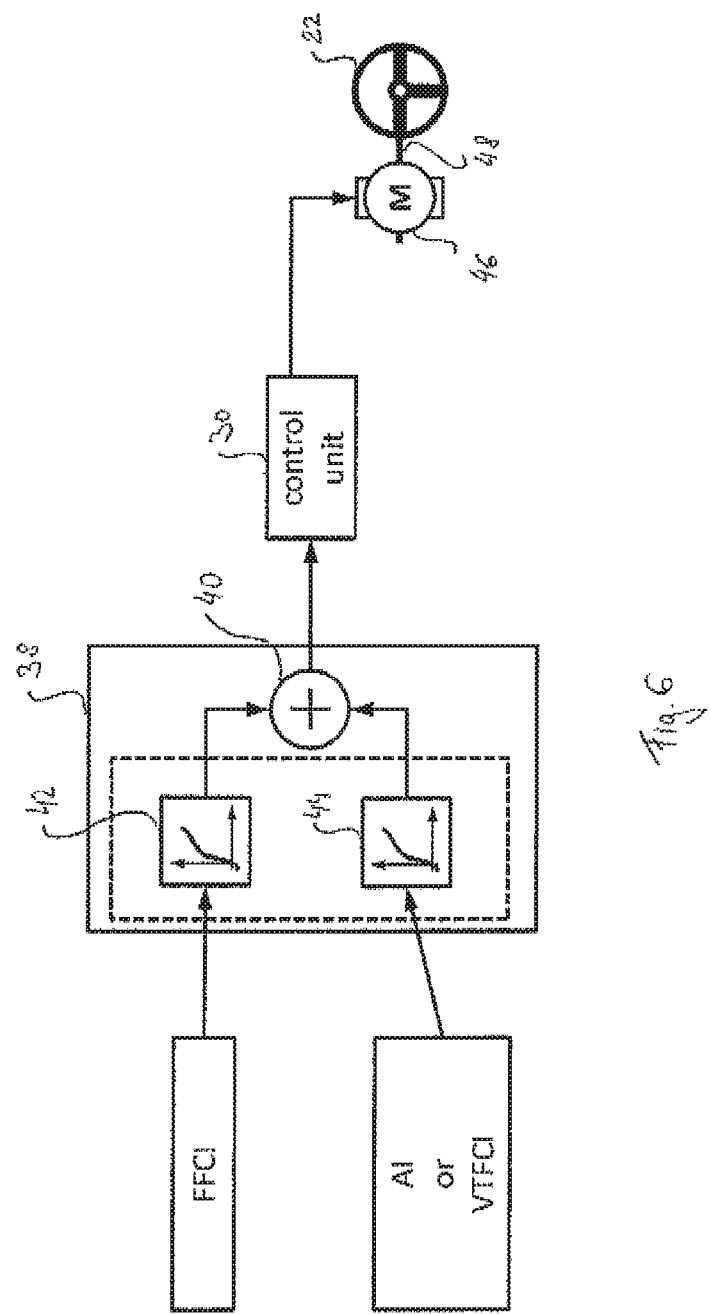

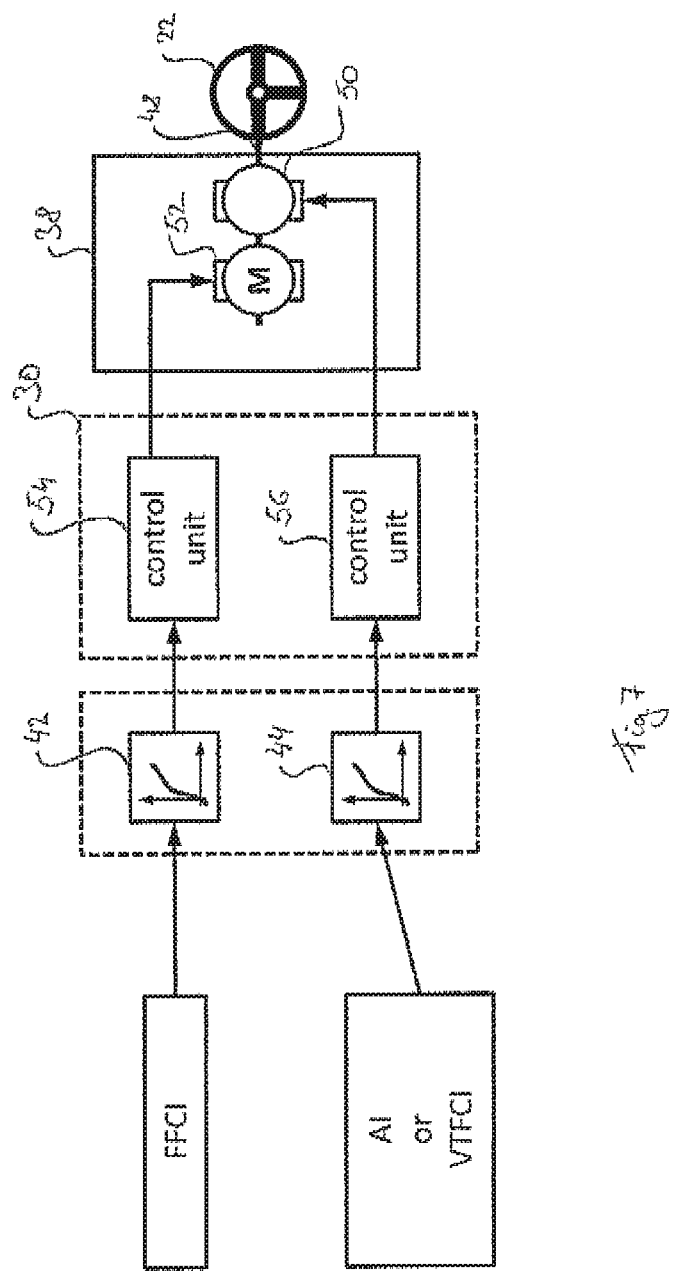

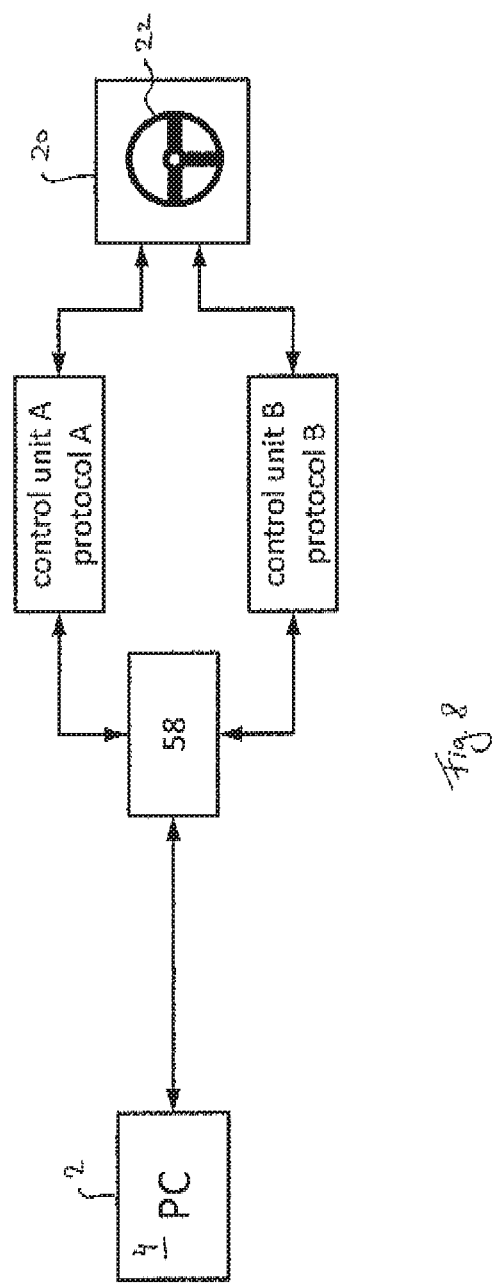

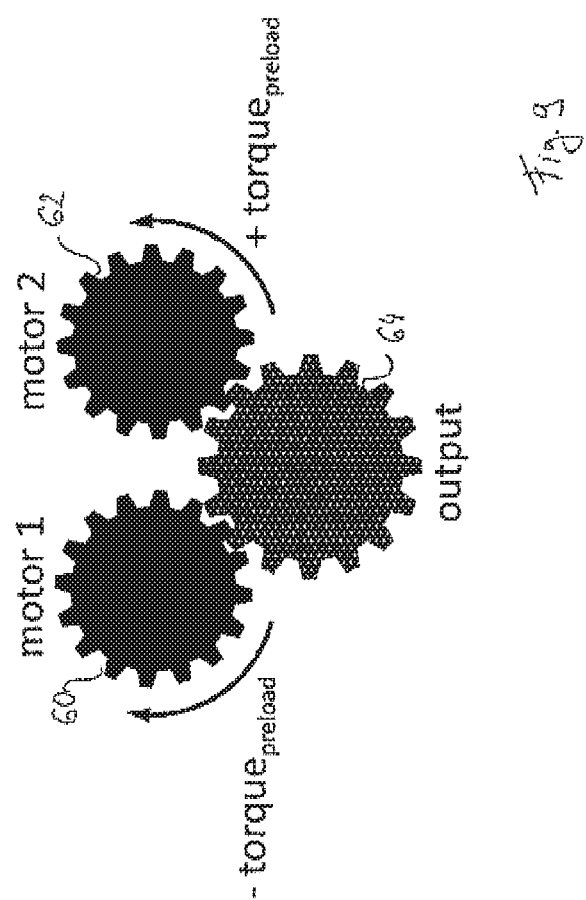

VIBRO-TACTILE FEEDBACK METHOD AND DEVICE

FIELD OF THE INVENTION

Figure 1A:
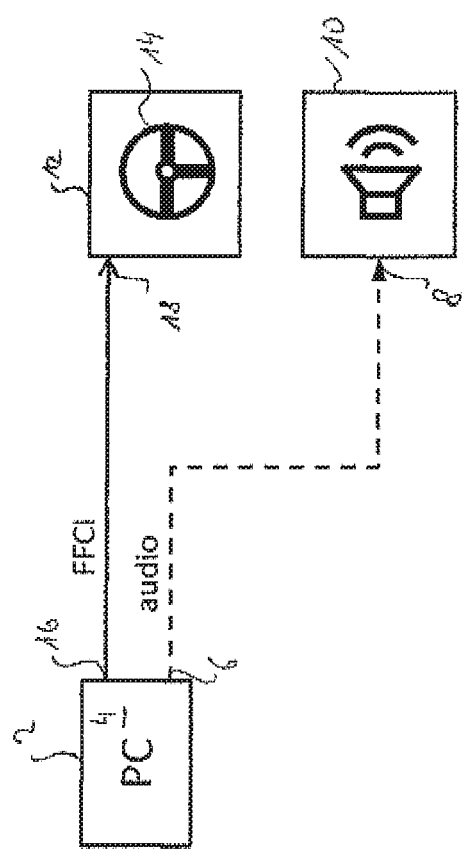

The present invention generally relates to user interface devices and, particularly, to vibro-tactile force feedback by means of user interface devices.

BACKGROUND

Gaming environments and simulation environments are examples for environments (in the following referred to as user-machine interaction environments) including user interface device by means of which a user can interact with respective application hardware and/or software (in the following short application device).

Originally, such user interface device have been input devices enabling a user to transmit (input) to the application device control commands, data, voice, etc. for interaction with the application device. Originally, the application device provided to the user only audio and/or video information.

An example for such a user-machine interaction environment is an application device in the form of a computer driving game, where the user interface is a steering wheel arrangement including a steering wheel by means of which a user can control (steer) the driving direction of a vehicle displayed by the computer driving game.

Enhanced user-machine interaction environments also provide force feedback to a user. To this end, the application device provides to the user interface device specific force feedback data defining force feedback to be provided to the user. To provide force feedback to the user, a user interface device comprises force feedback means controlled by force feedback data from the application device.

An example for such a user-machine interaction environment is an application device in the form of a computer driving game, where the user interface is a steering wheel arrangement including not only a steering wheel, but also force feedback means. Using the steering wheel arrangement, a user can control (steer) the driving direction of a vehicle displayed by the computer driving game. The force feedback means, based on specific force feedback data received from the computer driving game, generates forces acting on the steering wheel to provide the user with a force sensation the user would have when steering a real vehicle with its real steering wheel.

SUMMARY OF THE INVENTION

In order to traverse shortcomings of prior art solutions with respect to vibro-tactile force feedback, the present invention provides subject-matter according to the independent claims, wherein preferred variations, embodiments, examples etc. are defined in dependent claims.

Particularly, the present invention provides a method of providing vibro-tactile feedback to a user of a user interface device comprising at least one actuator adapted to provide vibro-tactile feedback to the user and communicatively coupled to an application device, wherein audio and/or acoustic information is obtained from the application device.

Kinesthetic force feedback is force feedback where the feedback sensation at the user's side is (primarily) perceived via user's muscle(s) and where the user perceives a direction of the feedback (e.g. force in upward direction). In some embodiments, force feedback having frequencies below 12 Hz may be considered as kinesthetic force feedback.

Contrary thereto, vibro-tactile force feedback provides a sensation of oscillating forces or torques at, with respect to the tactile capabilities of human beings. For example, vibro-tactile force feedback may have the form of vibrational force feedback. In some embodiment, vibro-tactile force feedback may start at frequencies above 12 Hz, where the sensory apparatus of a human being cannot perceive directional feedback information (i.e. a user cannot feel that the feedback has a direction). In further embodiments, the frequencies may be in the range of 50-150 Hz.

According to the present invention, the obtained audio and/or video information may include frequencies above one of the following frequency thresholds:

$$(12+a)\text{Hz}$$

with $$0 \leq a < 4000.$$

In further embodiments, the obtained audio and/or video information may include frequencies above one of the following frequency thresholds:

$$(50+a)\text{ Hz}$$

with $$0 \leq a < 100.$$

A user interface device of the present invention particularly may be a device providing bidirectional communication between a user of the user interface device and an application device being in communication with the user interface device. Particularly, a user interface device of the present invention allows its user to, on the one hand, input control commands for the application device by manipulation of a respective part of the user interface device (e.g. steering wheel, pedal(s), joystick per hand, data glove, data garment) by a part of the user's body (e.g. hand(s), foot/feet, upper and/or lower limbs, shifting/moving the whole body) and, on the other hand, provides the user with feedback information. The feedback information comprises vibro-tactile force feedback, but may also include kinesthetic force feedback.

Examples of the user interface device include
a steering wheel assembly,
a computer game input device,
a computer joystick,
a keyboard,
a pedal or pedal assembly,
a button,
a handle,
a seat,
a cushion,
a helmet,
a goggle,
a garment,
a wearable device,
a handheld input device,
a glove,
a sport equipment simulation for computer games,
a weapon simulation device for computer games,
a drive cockpit simulation device for computer games,
a pilot cockpit (or control surface) simulation device for computer games,
a helmsman/skipper/captain helm simulation device for computer games,
a medical instrument.

The at least one actuator may include one or more actuators specifically designed so that just vibro-tactile force feedback can be provided. In further examples, the at least one actuator may include one or more actuators adapted to provide both vibro-tactile force feedback and kinesthetic force feedback. In further examples, the at least one actuator may include one or more actuators adapted to provide only vibro-tactile force feedback and one or more actuators adapted to provide only kinesthetic force feedback.

The application device may be comprised of at least one of hardware and software adapted to provide at least audio and/or acoustic information.

Audio information may be provided in form of analog and/or digital audio data signals communicated from the application device to the user interface device via wired and/or wireless communication link. Acoustic information may be provided by means of a loudspeaker of the application device for transmission through air to a microphone or the like of the user interface device.

Obtaining audio and/or acoustic information may include to select, from the audio and/or acoustic information generally provided by the application device, one or more specific parts thereof. For example, if the application device provides audio and/or acoustic information via different (logical and/or physical) channels, communication links/paths etc., audio and/or acoustic information of one or more specific channels may be selected as audio and/or acoustic information to be obtained, while audio and/or acoustic information from other channels is not selected. In other words, the audio and/or acoustic information may be obtained from at least two different sources.

The audio and/or acoustic information may comprise audio and/or acoustic information from at least two different audio and/or acoustic information sources.

The obtaining of the audio and/or acoustic information may comprise selecting audio and/or acoustic information from the at least two different audio and/or acoustic information sources and/or mixing audio and/or acoustic information from the at least two different audio and/or acoustic information sources, wherein the mixed audio and/or acoustic information is used to control the at least one actuator.

The application device may also provide video information (video here encompasses also still images). In such cases, audio information may obtained by transmitting the audio information and video information together from the application device to the user interface device, where the audio information is extracted.

Examples of application devices include
a computer game,
a computer training system,
a driving simulation,
a flight simulation,
a water vehicle steering simulation,
a sport simulation,
a shooting simulation,
a medical simulation,
an application for operating a robotic apparatus,
an application for teleoperating a remotely located robotic apparatus,
each thereof being embodied as hardware and/or software.

Particularly, the above aspect of the present invention to obtain audio and/or acoustic information to provide vibro-tactile force feedback relates to the how and, if applicable, which audio and/or acoustic information is communicated from the application device to the user interface device.

As regards the "how", it has to be noted that user interface devices, particularly in the field of gaming, often employ a specific communication protocol, for example, referred to a Human Interface Device (HID) and more specifically its extension Physical Interface Device (PID). Such user interface devices are limited to render force primitives and effects locally (i.e. by the user interface device itself) on the basis of low rate update commands from an application device. As a result, forces rendered at the user interface device may exhibit inaccuracy, latency (delay) and discontinuities (e.g. force steps).

In such cases, the audio and/or acoustic information may be obtained by using such a specific communication protocol for transmission from the application device to the user interface device. This may be accomplished, for example, via one or several of the audio (or audio/video) channels of the application device used to playback sounds or a dedicated audio channel, using either a wired (e.g. analog, digital coaxial, digital optical, HDMI, DisplayPort, USB, Ethernet, FireWire or Thunderbolt cable) or a wireless (e.g. Bluetooth or Wi-Fi) connection. The audio and/or acoustic information may be directly transmitted to the user interface device and, more particularly its control part, where the obtained audio and/or acoustic information may be processed further as set forth below. The user interface device may have an audio (or audio/video) output connection (wired or wireless) as a pass-through feature so that obtained audio and/or acoustic information can be provided audio rendering equipment (e.g. loudspeaker system or headphones).

In other examples, the user interface and, particularly, its at least one actuator may be addressed and controlled directly by a further control unit that obtains the audio and/or acoustic information without limitation to a user interface device specific communication protocol from the application device. Such a further control unit may be comprised by the user interface device or may be a separate component communicatively located between the application device and the user interface device. Here, the audio and/or acoustic information may be transmitted via, for example, USB, FireWire, Thunderbolt, Ethernet directly with a high communication rate and/or packetized at a lower rate.

In line therewith, the audio and/or acoustic information may be obtained via at least one of:
  a general purpose audio output port of the application device,
  a dedicated audio output port or channel of the application device,
  a wired communication link with the application device,
  a wireless communication link with the application device,
  a force feedback output port of the application device,
  a loudspeaker,
  a microphone,
  a sensor.

The method may further comprise generating vibro-tactile force feedback control information on the basis of the obtained audio and/or acoustic information, the vibro-tactile force feedback control information defining at least one vibro-tactile force feedback to be provided to the user. The generation of vibro-tactile force feedback control information may be also referred to as shaping the obtained audio and/or acoustic information.

The generation of vibro-tactile force feedback control information (i.e. the shaping) may be adaptive and can involve further data.

The generation of vibro-tactile force feedback control information may be accomplished (partly) by the application device, which then provides the vibro-tactile force feedback control information to the user interface device, and/or (partly) by the user interface device and its control unit, respectively, and/or (partly) by the above mentioned further control unit.

The generation of vibro-tactile force feedback control information may be (also or alternatively) accomplished physically, for example, by means of the at least one actuator. For example, an actuator may be capable of generating vibro-tactile force feedback only in response to signals having specific frequency or a specific frequency range. Then, only that part of the obtained audio and/or acoustic information having the specific frequency or the specific frequency range will result in an activation of that actuator. Such "actuator inherent shaping" is an example for physically generating vibro-tactile force feedback control information.

To this end, according to the method, the vibro-tactile force feedback control information may be generated by at least one of the following:
    scaling at least a part of the obtained audio and/or acoustic information,
    pitching at least a part of the obtained audio and/or acoustic information,
    frequency shifting at least a part of the obtained audio and/or acoustic information,
    filtering at least a part of the obtained audio and/or acoustic information,
    bandwidth limiting at least a part of the obtained audio and/or acoustic information,
    equalizing at least a part of the obtained audio and/or acoustic information,
    truncating at least a part of the obtained audio and/or acoustic information,
    compressing at least a part of the obtained audio and/or acoustic information,
    delaying at least a part of the obtained audio and/or acoustic information,
    convoluting at least a part of the obtained audio and/or acoustic information,
    buffering of at least a part of the audio and/or acoustic information,
    content generation of artificial, continuity-maintaining audio and/or acoustic information,
    resampling of audio and/or acoustic information,
    modulation of a resampling rate to buffer a desired number of audio and/or acoustic information,
    encrypting audio and/or acoustic information,
    packetizing audio and/or acoustic information.

The kinesthetic force feedback control information and/or the vibro-tactile force feedback control information may be modified such that the mixed vibro-tactile force feedback control information and kinesthetic force feedback control information does not exceed an actuator output limitation.

Further, the kinesthetic and/or vibro-tactile force feedback control information may be modified, at least partially, by at least one of the following:
    scaling,
    pitching,
    frequency shifting,
    filtering,
    bandwidth limiting,
    equalizing,
    truncating,
    compressing,
    delaying,
    convoluting.

In the case audio and/or acoustic information from at least two different sources is obtained, for each of the obtained audio and/or acoustic information from at least two different audio and/or acoustic information sources vibro-tactile force feedback control information is generated, so that at least two vibro-tactile force feedback control information is generated, each thereof defining at least one vibro-tactile force feedback to be provided to the user.

Further, the method may comprise controlling the at least one actuator of the user interface device by means of the vibro-tactile force feedback control information to generate the at least one vibro-tactile force feedback for the user.

The at least one actuator may comprise at least one of the following:
    an electric motor,
    a step motor,
    a brushless motor,
    an electro-dynamical exciter,
    a loudspeaker,
    a voice-coil transducer,
    a moving magnet transducer,
    a piezo-electric transducer,
    a capacitor arrangement,
    an electro magnet arrangement,
    a friction based transducer,
    a particle brake,
    an eccentric rotating mass,
    a linear resonant actuator,
    a fluid containing flexible body (This could be a, for example, a cushion filled with water/air that can be brought into oscillation so that a user sitting on the cushion feels vibration).

The at least one actuator may be coupled or connected to a part of the user interface device, which the user generally or mandatorily contacts the user interface device for use thereof. For example, in the case of a steering wheel arrangement, the at least one actuator may be arranged in the steering wheel and/or coupled thereto such that activation of the at least one actuator generates vibro-tactile force feedback for the user in contact with the steering wheel.

In the case audio and/or acoustic information from at least two different sources is obtained and in the case the user interface device includes at least two actuators, the method may further comprise
    controlling at least one of the at least two actuators by means of one of the at least two vibro-tactile force feedback control information, and
    controlling at least another one of the at least two actuators by means of at least one of the remainders of the at least two vibro-tactile force feedback control information.

This allows to provide different vibro-tactile force feedback sensation, preferably at different locations and/or different parts of the body of the user.

As set forth above, the at least one actuator of the user interface device may be also adapted to provide force feedback to the user, then the method may further comprise
    mixing the vibro-tactile feedback control information and force feedback control information obtained from the application device to generate mixed vibro-tactile and kinesthetic force feedback control information, the force feedback control information defining at least one force feedback to be provided to the user,
    controlling at least one actuator of the user interface device by means of the mixed vi-bro-tactile and kinesthetic force feedback control information to generate the at least one vibro-tactile feedback and the at least one force feedback for the user.

The mixing of the vibro-tactile force feedback control information and the kinesthetic force feedback control information may be accomplished (partly) by the application device, which then provides the vibro-tactile feedback control information to the user interface device, and/or (partly) by the user interface device and its control unit, respectively, and/or (partly) by the above mentioned further control unit.

The mixing may be (also or alternatively) accomplished physically, for example, by controlling an actuator by using both the vibro-tactile force feedback control information and the kinesthetic force feedback control information at the same time.

As set forth above, the user interface device may comprise at least one force feedback actuator adapted to provide force feedback to the user, then the method may further comprise
obtaining force feedback control information from the application device, the force feedback control information defining at least one force feedback to be provided to the user
controlling the at least one force feedback actuator by means of the force feedback control information to generate the at least one force feedback for the user.

In some examples, the user interface device may comprise as actuators, at least two motors cooperatively used to generate vibro-tactile force feedback. An example for such cases is a steering wheel assembly, where at least two motors act (e.g. via a steering shaft) on a steering wheel in order generate forces/torques resulting in a vibro-tactile force feedback sensation at the steering wheel. Generally, it can be expected that the drive train between the motors and the steering wheel exhibits play due to tolerance and other mechanical deficiencies resulting in undesired effects at the steering wheel, e.g. clogging and backlash.

This may be resolved by operating the at least two motors with a fixed or variable torque offset there between. For example, the torque offset may be controlled such that the torque provided by the at least two motors as a result of the torque offset preloads (biases) the drive train (e.g. gears) between the at least two motors and the location, where vibro-tactile force feedback is to be provided, in manner removing, e.g., mechanical play of/in the drive train.

Preferably, the torque offset is controlled such that the resulting torque provided by the at least two motors as a result of the torque offset is null. In the case of two motors, this may be achieved by operating the two motors such that a first one of the two motors provides the torque offset in a first rotational direction and a second one of the two motors provides the torque offset in a second rotational direction being opposite to the first rotational direction.

Further, the present invention provides a vibro-tactile force feedback device for providing vibro-tactile force feedback information to a user of a user interface device comprising at least one actuator adapted to provide vibro-tactile force feedback to the user.

Generally, all observations above with respect to the method of the present invention correspondingly apply to the device of the present invention as well, what also vice versa applies to all following observations with respect to the method of the present invention which correspondingly apply to the device of the present invention as well.

The device according to the present invention comprises
a control unit,
an input communicatively coupled to the control unit and being adapted for obtaining audio and/or acoustic information of audio and/or acoustic information from an application device and providing the obtained audio and/or acoustic information to the control unit.

The control unit may be adapted to
generate vibro-tactile feedback control information on the basis of the obtained audio and/or acoustic information, the vibro-tactile force feedback control information defining at least one vibro-tactile force feedback to be provided to the user.

The control unit may comprise an at least one output for providing the vibro-tactile force feedback control information to the at least one actuator of the user interface device.

The at least one output of the control unit may be communicatively coupled to the at least one actuator of the user interface device, wherein the control unit may be adapted to
control the at least one actuator of the user interface device by means of the vibro-tactile force feedback control information to generate the at least one vibro-tactile force feedback for the user.

The at least one actuator of the user interface device may be also adapted to provide force feedback to the user, wherein the control unit may be adapted to
mix the vibro-tactile force feedback control information and kinesthetic force feedback control information obtained from the application device to generate mixed vibro-tactile and kinesthetic force feedback control information, the force feedback control information defining at least one force feedback to be provided to the user.

The control unit may comprise an at least one output for providing the mixed vibro-tactile and kinesthetic force feedback control information to the at least one actuator of the user interface device.

The at least one output of the control unit may be communicatively coupled to the at least one actuator of the user interface device, wherein the control unit may be adapted to
control the at least one actuator of the user interface device by means of the mixed vibro-tactile force and kinesthetic force feedback control information to generate the at least one vibro-tactile force feedback and the at least one kinesthetic force feedback for the user.

The user interface device may further comprise at least one kinesthetic force feedback actuator adapted to provide kinesthetic force feedback to the user, wherein the control unit may be adapted to
obtain kinesthetic force feedback control information from the application device, the kinesthetic force feedback control information defining at least one kinesthetic force feedback to be provided to the user.

The control unit may comprise an at least one output for providing the kinesthetic force feedback control information to the at least one kinesthetic force feedback actuator of the user interface device.

The at least one output of the control unit may be communicatively coupled to the at least one kinesthetic force feedback actuator of the user interface device, wherein the control unit may be adapted to
control the at least one kinesthetic force feedback actuator by means of the kinesthetic force feedback control information to generate the at least one kinesthetic force feedback for the user.

The input of the control unit may be adapted to obtain the audio and/or acoustic information via at least one of:
a general purpose audio output port of the application device, a dedicated audio output port or channel of the application device,
a wired communication link with the application device,
a wireless communication link with the application device,
a force feedback output port of the application device,
a loudspeaker,
a microphone,
a sensor.

The control unit may be adapted to generate the vibro-tactile feedback control information by at least one of:
scaling at least a part of the obtained audio and/or acoustic information,
pitching at least a part of the obtained audio and/or acoustic information,
frequency shifting at least a part of the obtained audio and/or acoustic information,
filtering at least a part of the obtained audio and/or acoustic information,
bandwidth limiting at least a part of the obtained audio and/or acoustic information,
equalizing at least a part of the obtained audio and/or acoustic information,
truncating at least a part of the obtained audio and/or acoustic information,
compressing at least a part of the obtained audio and/or acoustic information,
delaying at least a part of the obtained audio and/or acoustic information,
convoluting at least a part of the obtained audio and/or acoustic information,
buffering of at least a part of the audio and/or acoustic information,
content generation of artificial, continuity-maintaining audio and/or acoustic information,
resampling of audio and/or acoustic information,
modulation of a resampling rate to buffer a desired number of audio and/or acoustic information,
encrypting audio and/or acoustic information,
packetizing audio and/or acoustic information.

The control unit may be adapted to modify the kinesthetic force feedback control information and/or the vibro-tactile force feedback control information such that the mixed vibro-tactile force feedback control information and kinesthetic force feedback control information does not exceed an actuator output limitation.

The control unit may be adapted to modify the kinesthetic and/or vibro-tactile force feedback control information, at least partially, by at least one of the following:
scaling,
pitching,
frequency shifting,
filtering,
bandwidth limiting,
equalizing,
truncating,
compressing,
delaying,
convoluting.

The control unit may be adapted to obtain audio and/or acoustic information from at least two different audio and/or acoustic information sources.

The control unit may be adapted to generate for each of the obtained audio and/or acoustic information from at least two different audio and/or acoustic information sources vibro-tactile force feedback control information, so that at least two vibro-tactile force feedback control information is generated, each thereof defining at least one vibro-tactile force feedback to be provided to the user.

The user interface may include at least two actuators, wherein the control unit may be adapted to
control at least one of the at least two actuators by means of one of the at least two vibro-tactile force feedback control information, and
control at least another one of the at least two actuators by means of at least one of the remainders of the at least two vibro-tactile force feedback control information.

Further, the present invention provides a system comprising a device according to the present invention and a user interface device comprising at least one actuator adapted to provide vibro-tactile force feedback to the user.

Generally, all observations above with respect to the method and device of the present invention correspondingly apply to the system of the present invention as well, what also vice versa applies to all following observations with respect to the system of the present invention which correspondingly apply to the method and device of the present invention as well.

The system may further comprise an application device.

Further, the present invention provides a computer software product including executable software code being stored on a computer-readable medium and, when being executed by means of a computing device, carrying out the steps of the method according to present invention.

Further, it is herewith disclosed that the above teachings of the present invention, which have been described with respect to vibro-tactile force feedback, may by also applied with respect to kinesthetic force feedback. In other words, in the above observations the term "vibro-tactile force feedback" can be replaced by "kinesthetic force feedback".

As noted above, kinesthetic force feedback generally includes directional information to the user. Therefore, in some examples, additional information (e.g. extracted from the audio and/or acoustic information) may be used to generate directional information.

SHORT DESCRIPTION OF THE DRAWINGS

Figure 2:
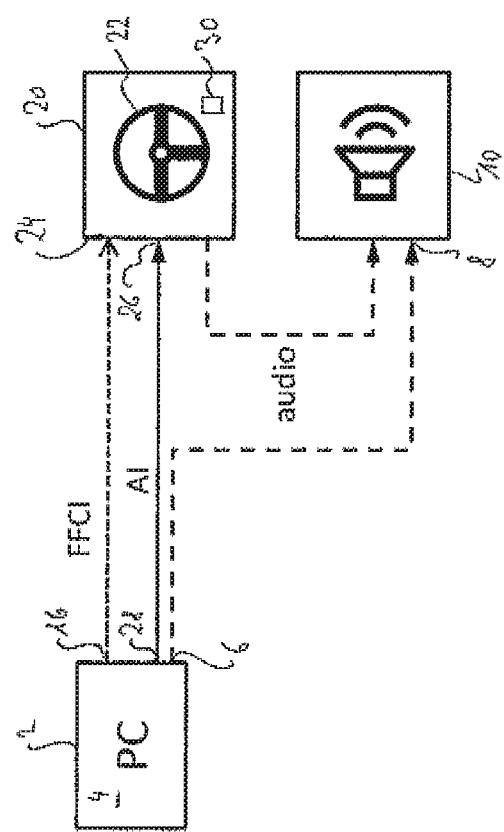
Figure 10A:
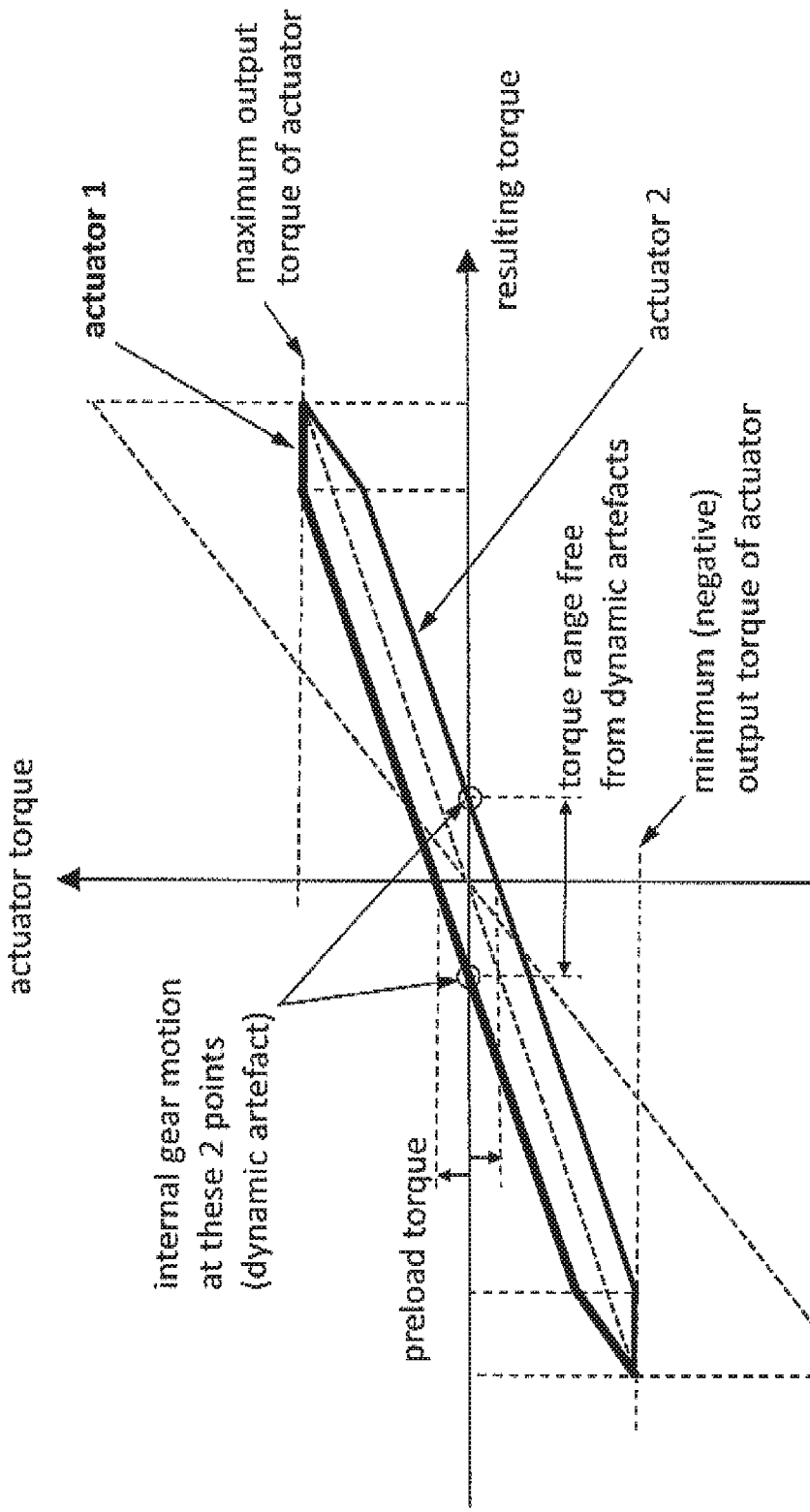
Figure 10B:
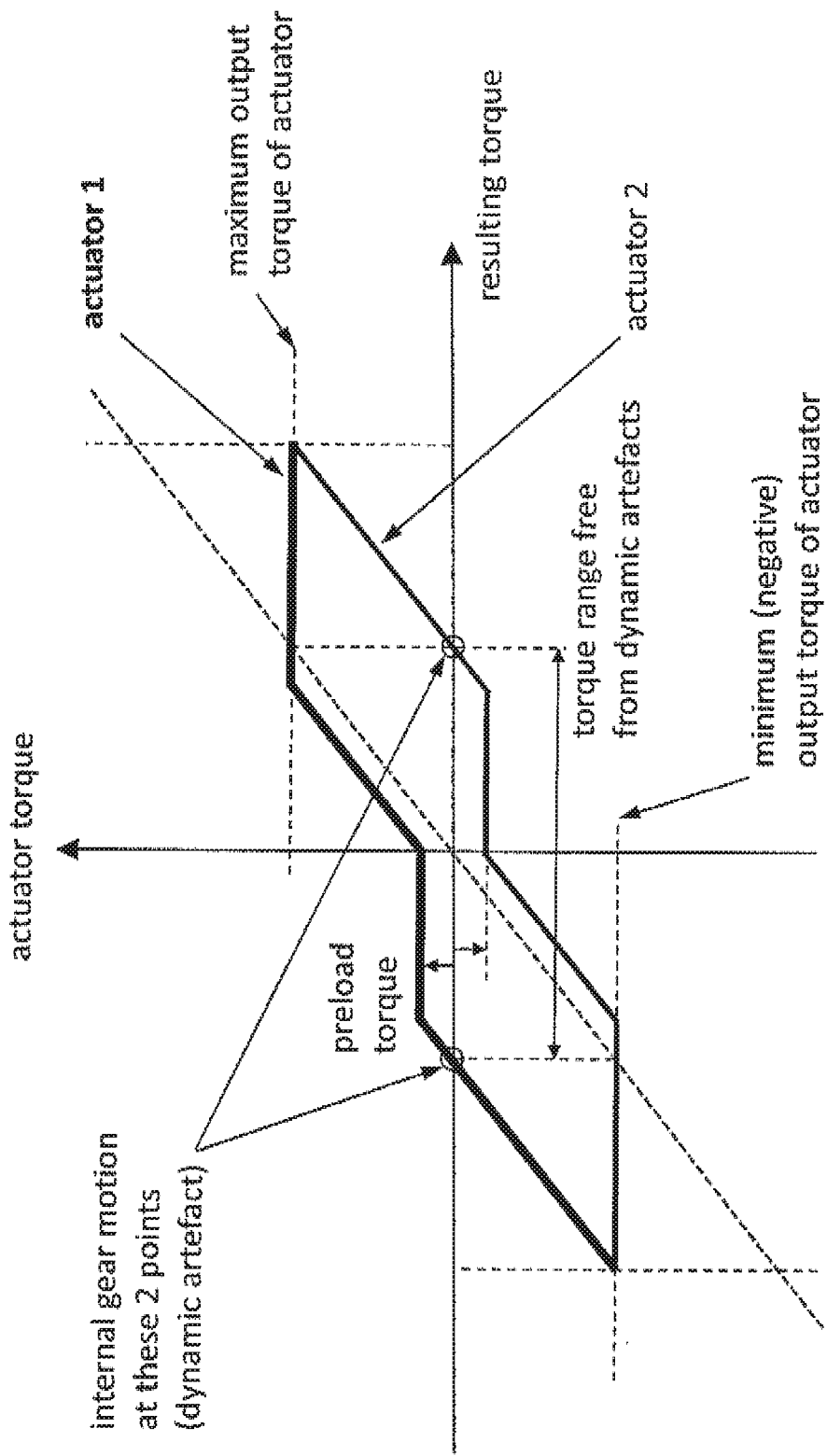
Figure 11:
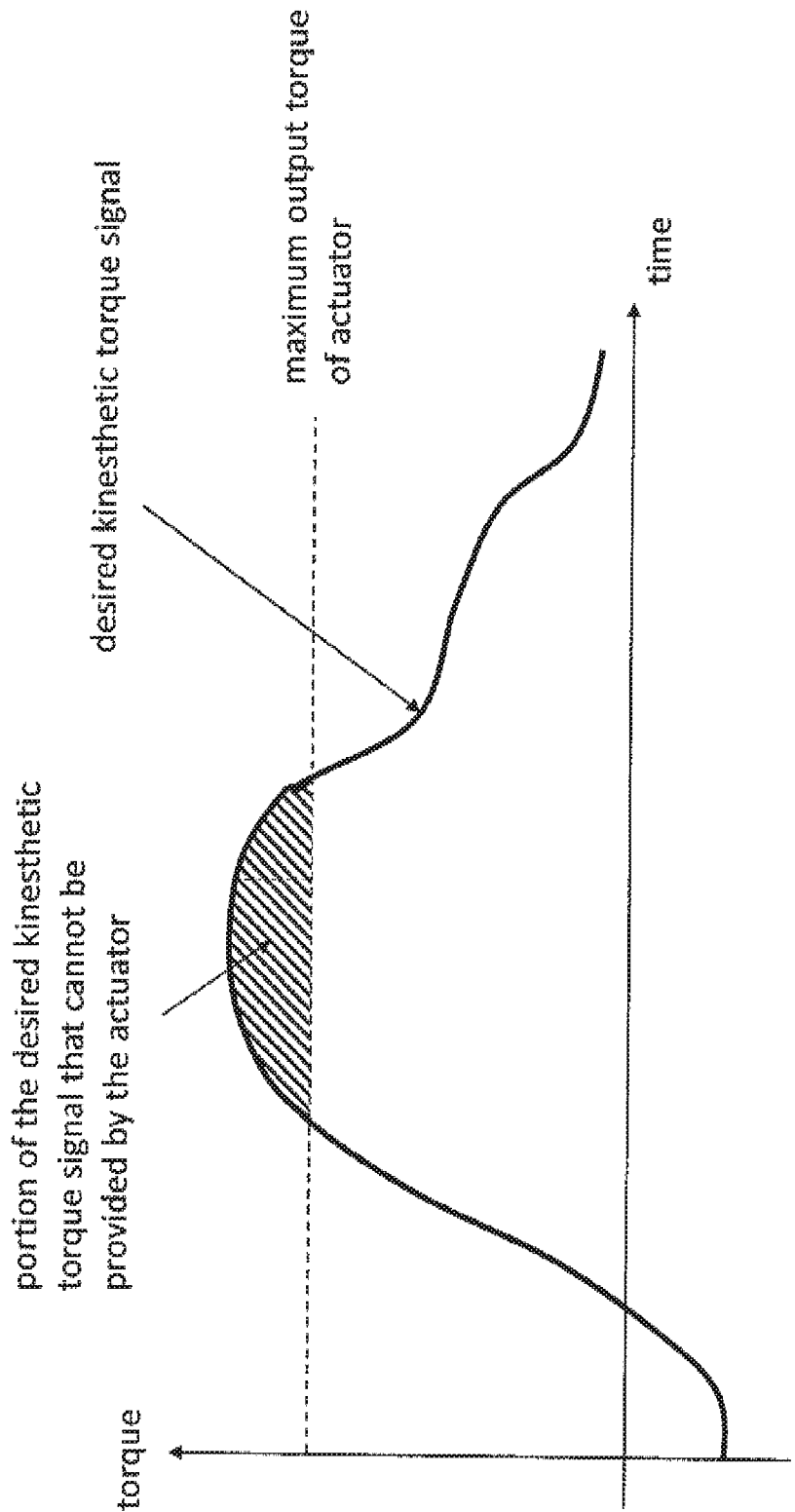
Figure 12:
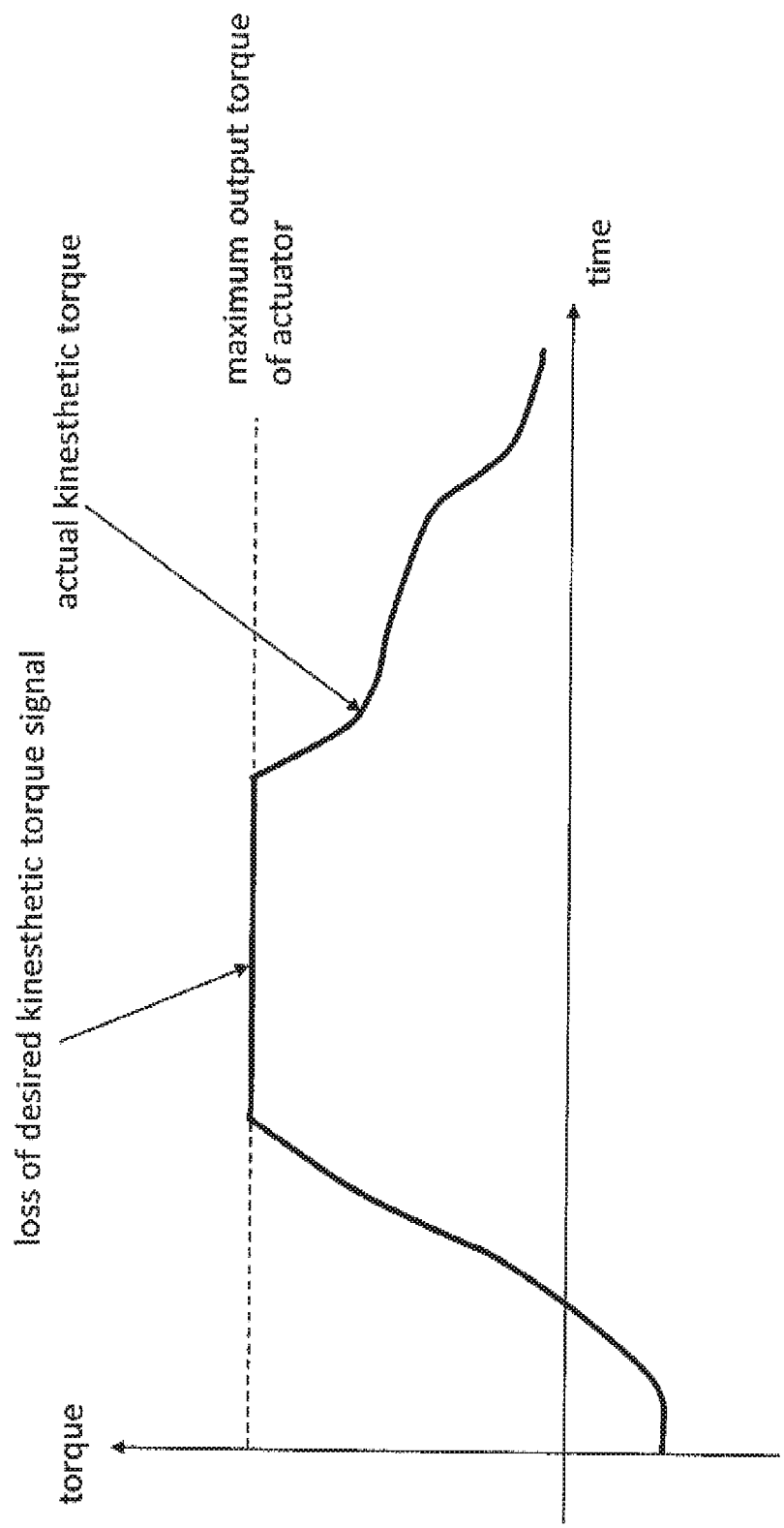
Figure 13:
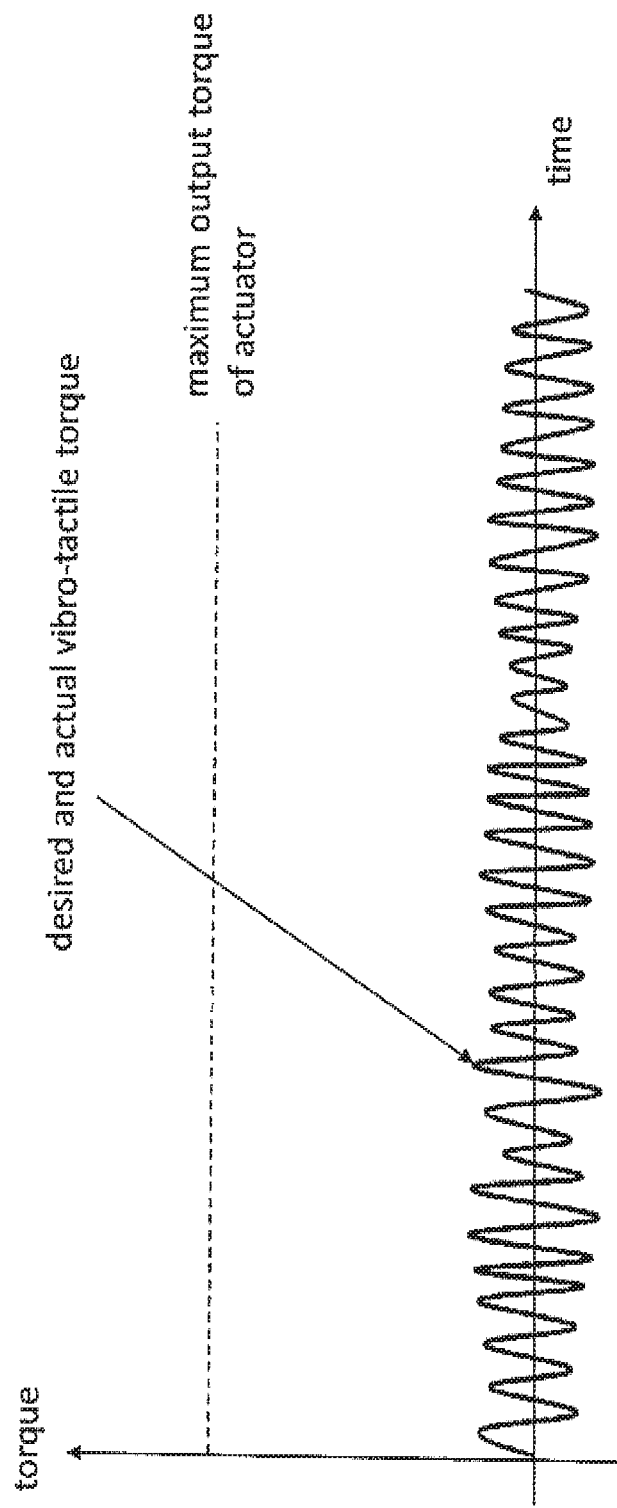
Figure 14:
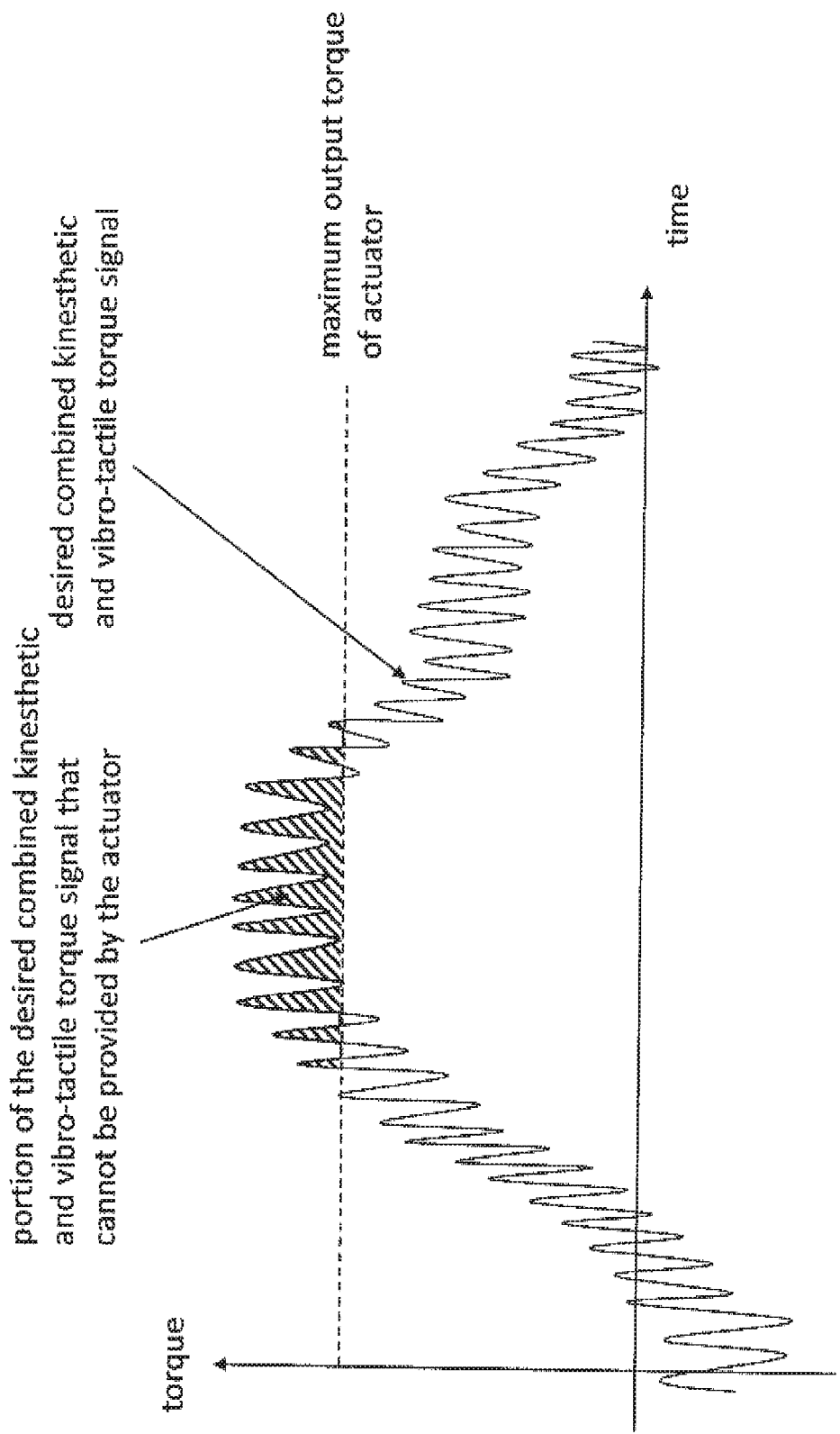
Figure 15:
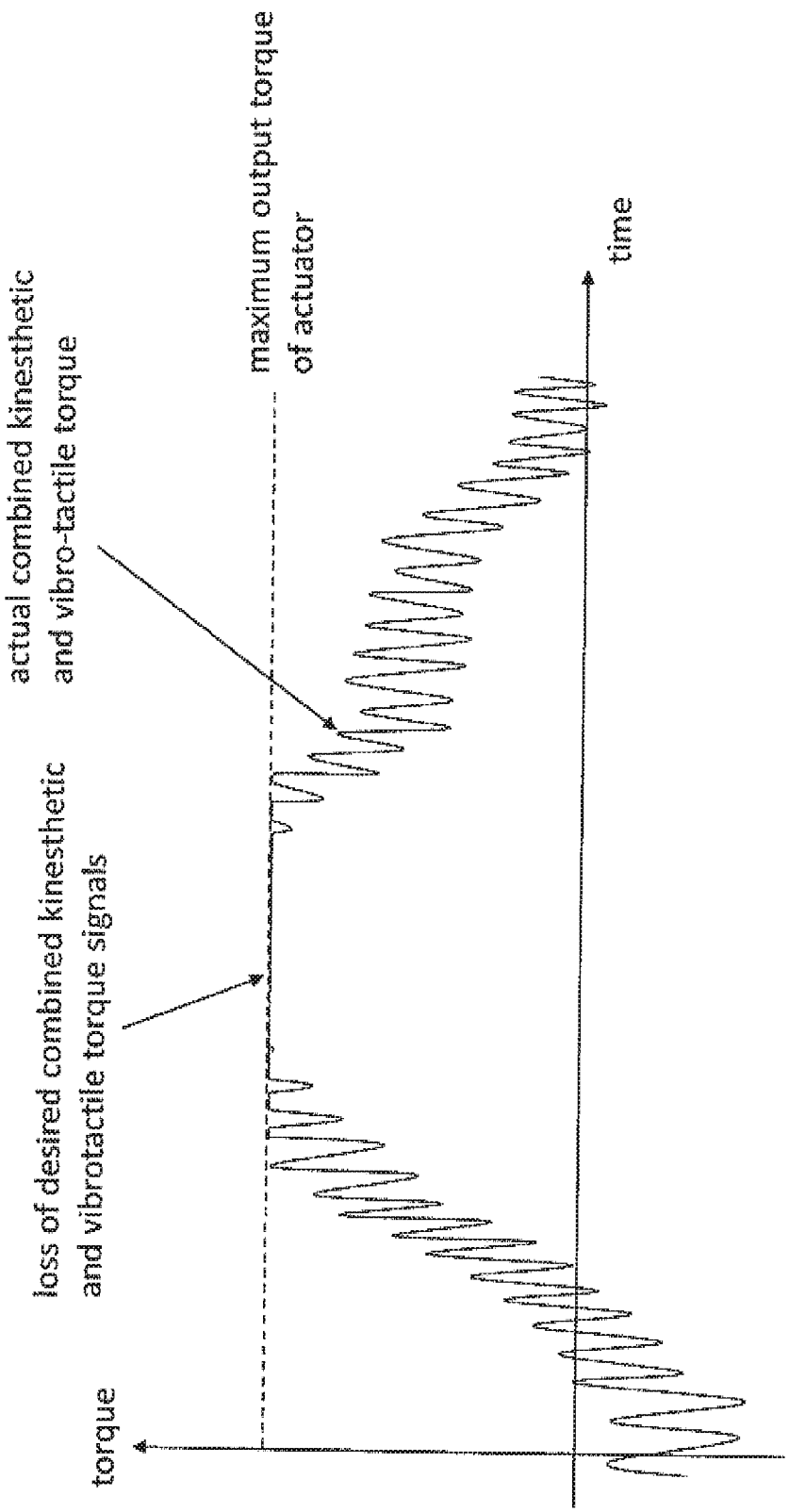
Figure 16:
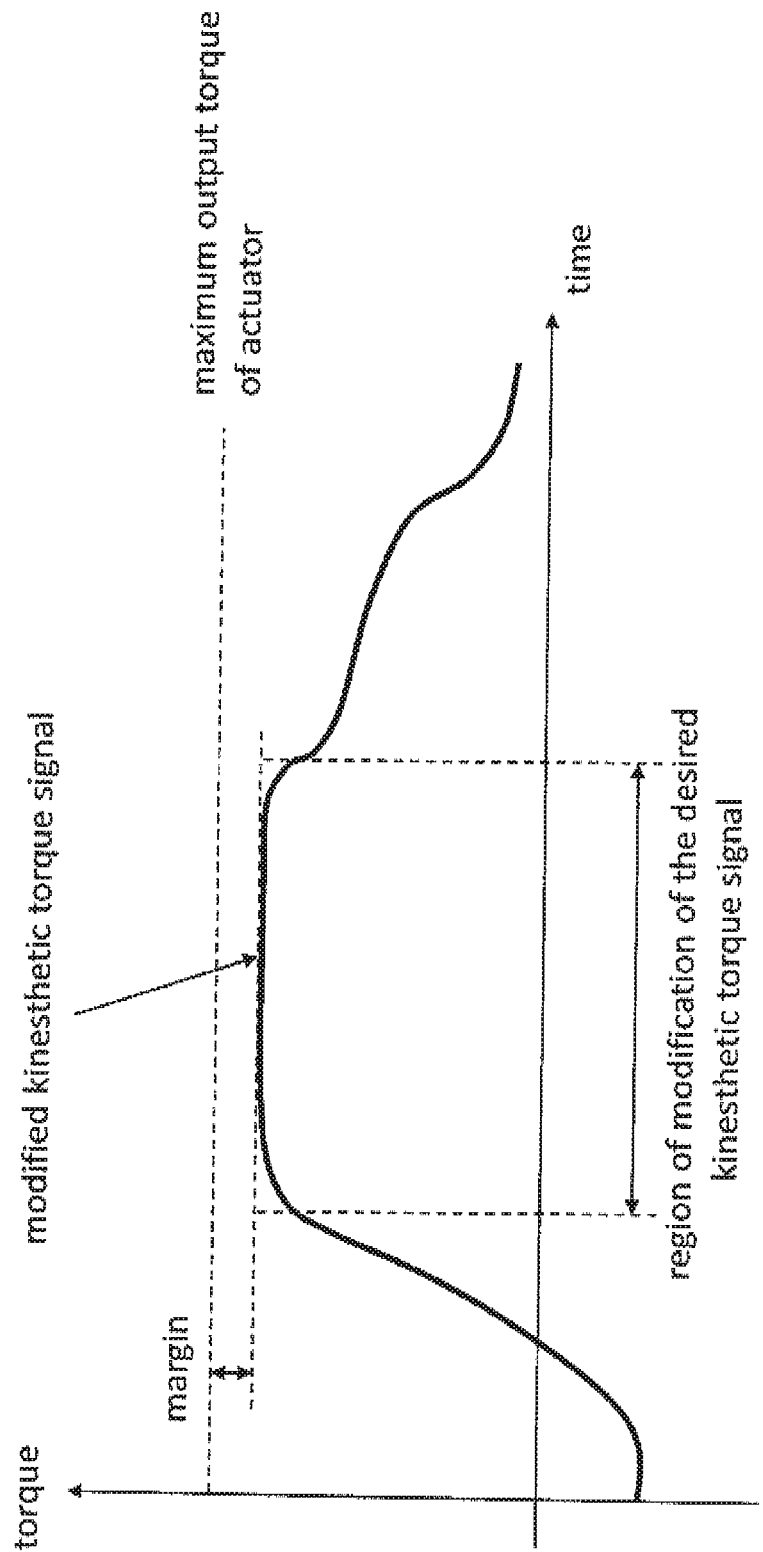
Figure 17:
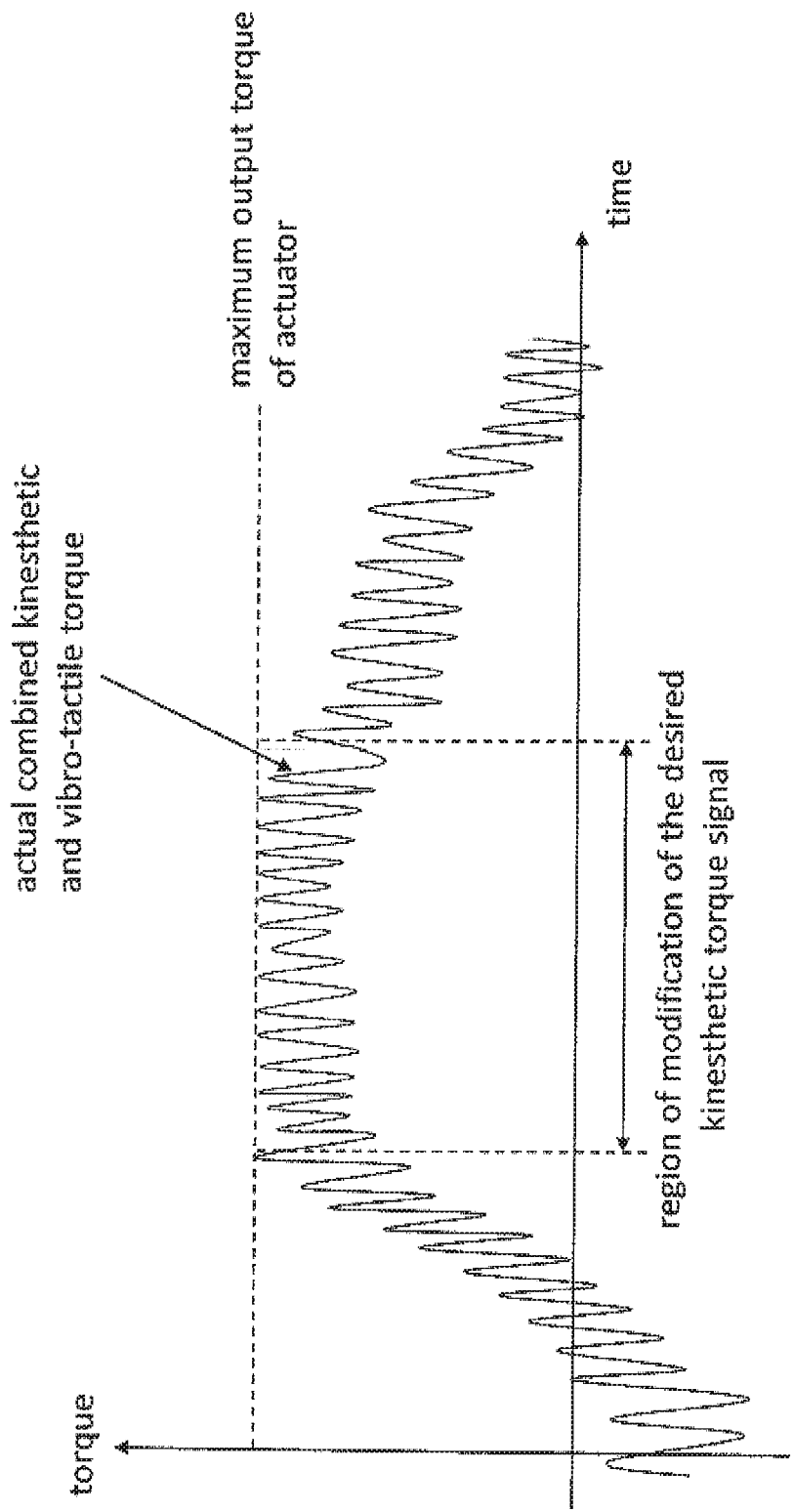

Examples of the present disclosure will now be described, by way of example, and with reference to the accompanying drawings, in which:
FIG. 1 schematically illustrates a prior art arrangement,
FIG. 2 schematically illustrates an example of the present invention,
FIG. 3 schematically illustrates an example of the present invention including a single audio information source for audio information for the generation of vibro-tactile feedback,
FIG. 4 schematically illustrates an example of the present invention including multiple audio information sources for audio information for the generation of vibro-tactile feedback,
FIG. 5 schematically illustrates a further example of the present invention including multiple audio information sources for audio information for the generation of vibro-tactile feedback,
FIG. 6 schematically illustrates an example of the present invention including mixing of, on the one hand, force feedback control information and, on the other hand, audio information or vibro-tactile feedback control information,
FIG. 7 schematically illustrates a further example of the present invention including mixing of, on the one hand, force feedback control information and, on the other hand, audio information or vibro-tactile feedback control information, FIG. 8 schematically illustrates an example of the present invention for use with different communication protocols, FIG. 9 schematically illustrates an example of the aspect of the present invention concerning operation of different motors with internal torque, FIGS. 10a and 10b schematically illustrate torques in the case of two motors, FIG. 11 schematically illustrates an exemplary desired kinesthetic torque commanded to an actuator (motor) over time for a case where the exemplary desired kinesthetic torque exceeds an exemplary maximum possible torque of the actuator (motor), FIG. 12 schematically illustrates an exemplary actual kinesthetic torque from an actuator (motor) over time, FIG. 13 schematically illustrates an exemplary desired and actual vibro-tactile torque commanded to an actuator (motor) over time, FIG. 14 schematically illustrates an exemplary desired combined kinesthetic and vibro-tactile torque commanded to an actuator (motor) over time for a case where the exemplary actual combined kinesthetic and vibro-tactile torque exceeds an exemplary maximum possible torque of the actuator (motor), FIG. 15 schematically illustrates an exemplary actual combined kinesthetic and vibro-tactile torque from an actuator (motor) over time, FIG. 16 schematically illustrates an exemplary kinesthetic torque commanded to an actuator (motor) modified over a region, FIG. 17 schematically illustrates an exemplary actual combined kinesthetic and vibro-tactile torque from an actuator (motor) over time for a case where kinesthetic torque is modified over a region.

Figure 18:
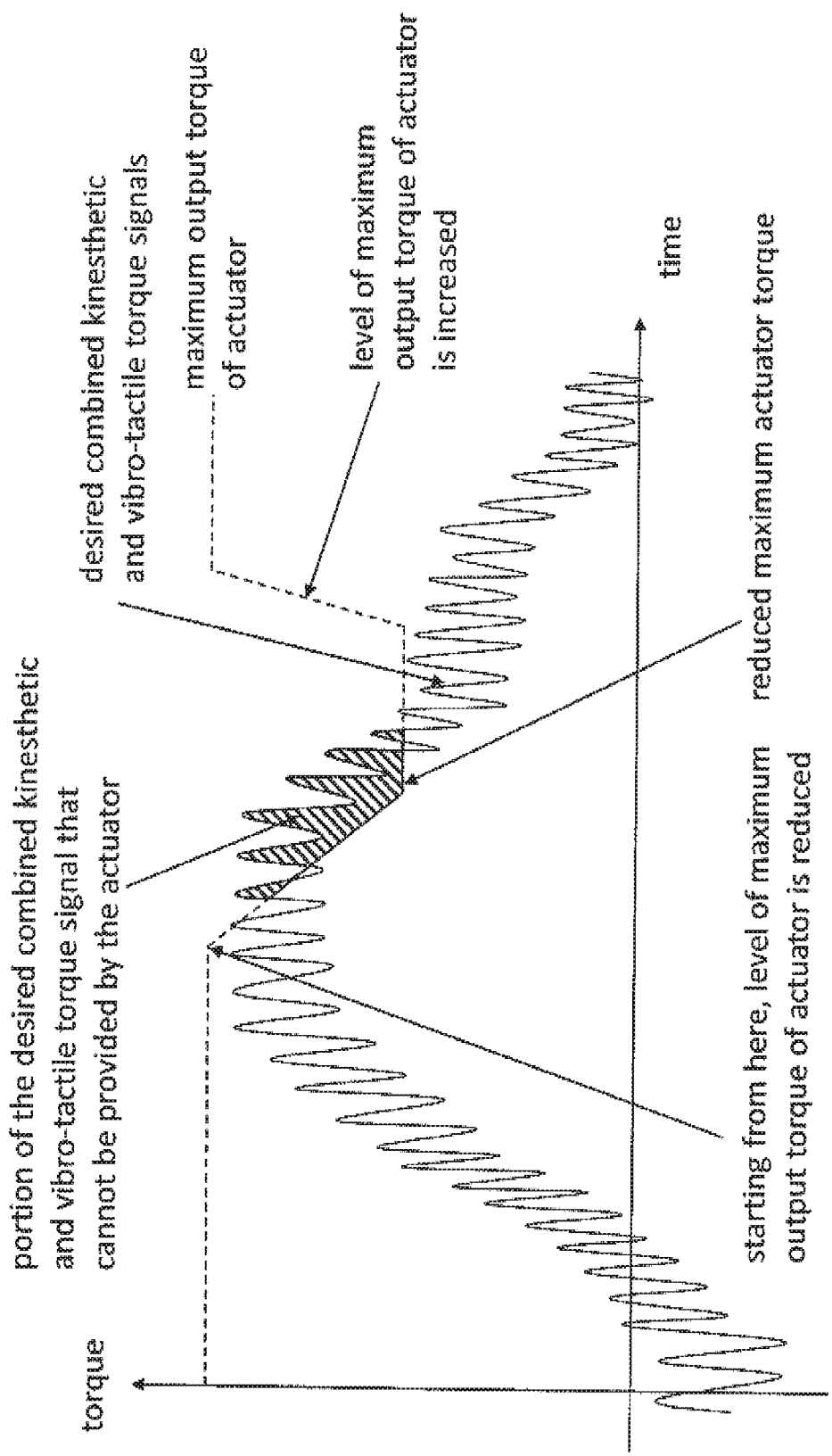
Figure 19:
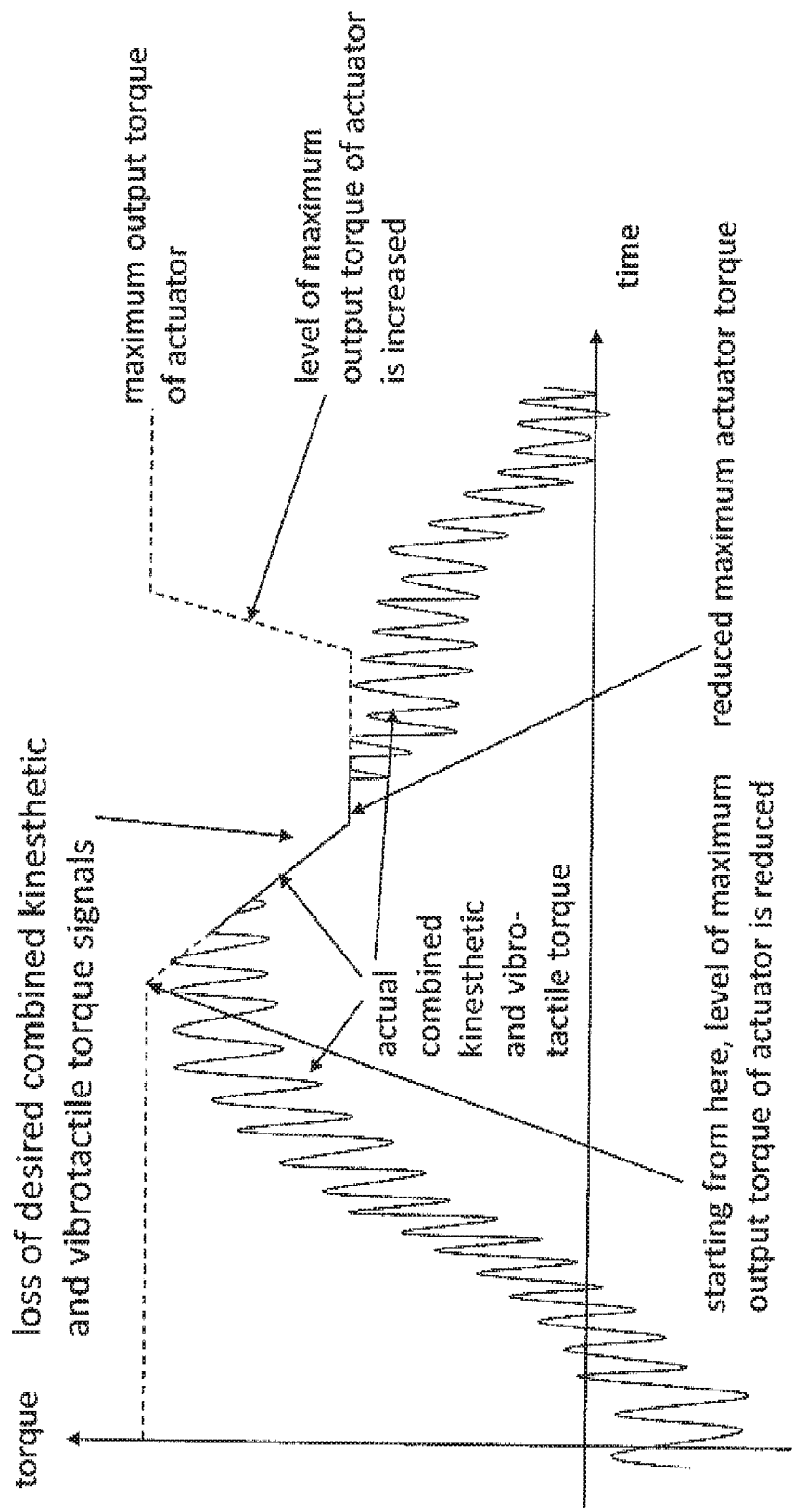

FIG. 18 schematically illustrates an exemplary desired combined kinesthetic and vibro-tactile torque commanded to an actuator (motor) over time for a case where the exemplary actual combined kinesthetic and vibro-tactile torque exceeds an exemplary maximum possible output (torque) of the actuator (motor), FIG. 19 schematically illustrates an exemplary actual combined kinesthetic and vibro-tactile torque from an actuator (motor) over time,

DETAILED DESCRIPTION

Consumer force feedback steering wheels have been designed around a unique architecture where a microcontroller, located inside the steering wheel controller, is programmed to generate a selection of preprogrammed force profiles on the device. These force profiles can be parametrized by the application through commands that identify a desired force profile with its associated settings (e.g. stiffness, damping, magnitude, frequency, etc.)

While this architecture addressed many of the limitations of early USB technology (1.0) and single core CPUs, it has become a serious bottleneck with more recent game developments.

Today's car games not only render high resolution graphic representations of the vehicles and road environments, but also incorporate advanced physical models (e.g. vehicle dynamics, tire contact, slippage, collisions, etc.) where the overall behavior of the vehicle is computed with a high level of realism. To reflect a vehicle's dynamics to a steering wheel, these simulators convert the computed steering-wheel forces into pre-programmed haptic effects that try to mimic what a real steering wheel would feel like. There are two issues that arise from doing so: (1) the carefully calculated physics from the game is simplified, and therefore degraded, when converted into the limited set of force primitives that the current steering wheel control protocol supports, and (2) the limited communication bandwidth of these control interfaces (e.g. in the order of 100 Hz) and the non-real-time nature of the software interface, means that the force-feedback is poorly synchronized with the real-time car behavior, and that the wheel stability is dependent on the performance of the computer being used.

An actuator can generate forces or torques up to a maximum output level. These limitations are defined by the characteristics of the actuator such as its size, magnets, wirings, maximum currents, maximum dissipated power, static behavior, dynamic behavior, and/or external factors, like thermal resistance to the environment which affects the actuator's temperature, as well as characteristics of the associated control unit.

When both kinesthetic and vibro-tactile force feedback signals are combined, and when the kinesthetic force feedback signal alone reaches the maximum output level of at least one of the actuators, the vibro-tactile force feedback signal is lost and can no longer be perceived by the user. This undesired artifact creates a discontinuity or a modification in the perceived frequency of the force feedback signal.

Since humans are highly sensitive to frequency changes and have a relatively poor sense about force direction and force magnitude, the present invention provides a method to maintain vibro-tactile feedback by reducing the kinesthetic force feedback magnitude to partially or fully include the vibro-tactile force feedback signal in the available actuator output range.

FIG. 1 illustrates a prior art arrangement including an application device 2 comprises gaming software 4 providing a virtual driving game and hardware PC for executing that software. The application device 2 has an audio output 6 for outputting audio information to be provided to a user during playing the game. To this end, the audio output is coupled with an audio input 8 of an audio output device 10 of the user (e.g. loudspeaker, headphones).

Further, the application device of FIG. 1 provides kinesthetic force feedback control information FFCI defining force feedback to be provided to the user by means of a user interface device 12. The user interface device 12 here is, due to the fact that the application device provides a driving game, a steering wheel arrangement, which includes a steering wheel 14 and at least one actuator acting on the steering wheel, for example, by means of a motor coupled to a steering wheel shaft via gears. The at least one actuator generates forces in response to force feedback control information FFCI received from the application device 2, which forces acting on the steering wheel to provide a respective force feedback for the user. Force feedback control information FFCI is transmitted from the application device 2 via a force feedback control information output 16 to a force feedback control information input 18 of the steering wheel arrangement 12.

For the sake of completeness, it has to be noted that force feedback also includes information returned from the user interface device, for example, information provided by sensor, which determines position and/or movements of components participating in the generation of force feedback (e.g. a sensor determining rotational positions of the steering wheel).

FIG. 2 illustrates an example of the present invention comprising an application device 2 and an audio output device 10 of the user, which respectively may be comparable with the application device 2 and the audio output device 10, respectively, of FIG. 1. Therefore, the respective above observations also apply here, unless otherwise noted.

The example of FIG. 1 comprises a steering wheel arrangement 20 including a steering wheel 22 and at least one actuator, which is adapted to act on the steering wheel in such a manner that force feedback and/or vibro-tactile feedback can be provided at the steering wheel 22.

Force feedback control information FFCI may be optional as indicated by the dashed line and, if applicable, transmitted from the application device 2 via a force feedback control information output 16 to a force feedback control information input 24 of the steering wheel arrangement 20 and may be used as in the prior art arrangement of FIG. 1.

The user interface device 20 also comprises an audio input 26 for receiving audio information from the application device 2. The audio input 26 can be coupled to the audio output 6 of the application device 2 or, as illustrated, to a further audio output 28 of the application device. For example, the audio output 6 may be an output providing analogue audio information and the audio output 28 may be an output providing digital audio information.

The audio information AI provided to the user interface device 20 may be the same as the audio information provided to the audio input 8 of the audio output device 10.

The user interface device 20 includes a control unit 30 having an input to receive force feedback control information FFCI and audio information AI. Further, the control unit 30 comprises an output communicatively coupled to the at least one actuator.

Upon receipt of audio information AI, the control unit 30 generate, on the basis of the obtained audio information, vibro-tactile force feedback control information defining at least one vibro-tactile force feedback to be provided to the user.

Having generated vibro-tactile force feedback control information, the control unit 30 either transmits the vibro-tactile force feedback control information to the at least one actuator, which in response thereto operates to generate the defined at least one vibro-tactile force feedback at the steering wheel 22, or the control unit 30 directly controls, on the basis of the vibro-tactile force feedback control information, the at least one actuator such that the defined at least one vibro-tactile force feedback at the steering wheel 22 is generated.

In the case of the control unit 30 also receives kinesthetic force feedback control information FFCI, the control unit 30 either transmits the kinesthetic force feedback control information FFCI to the at least one actuator, which in response thereto operates to generate the defined kinesthetic force feedback at the steering wheel 22, or the control unit 30 directly controls, on the basis of the kinesthetic force feedback control information FFCI, the at least one actuator such that the defined kinesthetic force feedback at the steering wheel 22 is generated.

The control unit 30 may mix received kinesthetic force feedback control information FFCI and generated vibro-tactile feedback control information so that the at least one actuator operates according to the mixture of kinesthetic force feedback control information FFCI and vibro-tactile feedback control information.

In further examples, the received kinesthetic force feedback control information FFCI and generated vibro-tactile force feedback control information may be independently used, also at the same time.

Audio information to be provided via the audio output in device 10 may be communicated thereto via the audio output 6 of the application device to and the audio input 8 of the audio output device 10 and/or may be the audio information AI obtained at audio input 26 of the user interface device 20 (or parts thereof) passed through the user interface device 22 to the audio output device 10.

In FIGS. 3, 4 and 5, only some components related to audio information AI are illustrated for the sake of simplicity. However, the examples of FIGS. 3, 4 and 5 may comprise any or all further components described above with respect to FIG. 2 (e.g. force feedback related components.)

The application device 2 may provide audio information AI via a single source 32 (e.g. being a part of the application device's hardware and/or software for audio) and a single audio output 28, as illustrated FIG. 3.

The single source 32 may be an audio channel of the application device 2 and may provide all audio information available or just specific parts thereof. In the latter case, the application device to may carry out preprocessing of the available audio information in order to extract and provide to the user interface device 20 only those parts suitable/required/predefined for the generation of vibro-tactile force feedback.

The application device 2 may provide audio information AI via multiple sources 32a, 32b, 32c, . . . (e.g. being parts of the application device's hardware and/or software for audio) and a single audio output 28, as illustrated FIG. 4.

The application device 2 may provide audio information AI via multiple sources 32a, 32b, 32c, . . . (e.g. being parts of the application device's hardware and/or software for audio) and multiple audio outputs $28_1$, $28_2$, 28,3 . . . as illustrated FIG. 5.

Each of the multiple sources 32a, 32b, 32c, . . . may be an audio channel of the application device 2. Each of the multiple sources 32a, 32b, 32c, . . . may provide specific parts of the available audio information. It is possible that the audio information parts from the multiple sources 32a, 32b, 32c, . . . , in sum, represent the overall available audio information or, in sum, represent only one or more parts of the overall available audio information.

According to FIG. 4, the audio information parts from the multiple sources 32a, 32b, 32c, . . . are mixed in a mixer 34 of the application device 2. The mixer 34 can be summer just generating audio information comprising the audio information parts from the multiple sources 32a, 32b, 32c, . . . as received. Alternatively, the mixer 34 may be adapted and/or operated such that the audio information parts from the multiple sources 32a, 32b, 32c, . . . are (individually or commonly) preprocessed to take into account that audio information from the multiple sources 32a, 32b, 32c, . . . may have different importance for and impact on the generation of vibro-tactile force feedback. In such examples, it can be said that at least the processing of audio information from the multiple sources 32a, 32b, 32c, . . . at the application device 2 is a part of the generation of vibro-tactile force feedback.

According to FIG. 5, the audio information parts from the multiple sources 32a, 32b, 32c, . . . are mixed in a mixer 36 of the user interface device 20. The mixer 36 can be summer just generating audio information comprising the audio information parts from the multiple sources 32a, 32b, 32c, . . . as received. Alternatively, the mixer 36 may be adapted and/or operated such that the audio information parts from the multiple sources 32a, 32b, 32c, . . . are (individually or commonly) preprocessed to take into account that audio information from the multiple sources 32a, 32b, 32c, . . . may have different importance for and impact on the generation of vibro-tactile force feedback. For example, the mixer 36 may comprise processing functions as provided by a processing device for processing kinesthetic force feedback control information and/or a processing device for processing either audio information or vibro-tactile force feedback control information, as explained with reference to FIGS. 6 and 7.

In such examples, it can be said the generation of vibro-tactile force feedback only takes place at the user interface device 20.

FIGS. 6 and 7 illustrate examples of the present invention including mixing of, on the one hand, kinesthetic force feedback control information and, on the other hand, audio information or vibro-tactile force feedback control information.

In the example of FIG. 6, mixing 38 is carried out by means of a mixer 40. The mixing 38 may optionally involve using processing device 42 for processing kinesthetic force feedback control information FFCI and/or using processing device 44 for processing either, as explained below, audio information AI or vibro-tactile force feedback control information VTFCI generated on the basis of audio information AI as explained above.

As indicated by the dashed rectangle around the processing device 42 and the processing device 44, they can be separate components or integrally provided by means of a common unit.

In the case kinesthetic force feedback control information FFCI and audio information AI are to be mixed, the mixer 40 can be located in or provided by the application device 2, can be located in or provided by an intermediate processing device arranged between the application device 2 and the user interface device 20 or can be located in or provided by the user interface device 20. In the case, at least one of the processing device 42 and the processing device 44 are also used, the processing device 42 and/or 44 can be located in or provided by the same device as for the mixer 40 or can be located in or provided by a device "upstream".

The mixer 40 can be summer just summing the kinesthetic force feedback control information FFCI and the audio information AI and forwarding the same to the control unit 30 of the user interface device 20.

In further examples, before the mixer 40, the kinesthetic force feedback control information FFCI may be processed by the processing device 42. The processing device 42 may, for example, apply a weighing function onto the kinesthetic force feedback control information FFCI in order to, e.g., enhance and/or attenuate parts of the kinesthetic force feedback control information FFCI, particularly such that their respective importance for and impact on the generation of kinesthetic force feedback is taken into account.

In further examples, before the mixer 40, the audio information AI may be processed by the processing device 44. The processing device 44 may, for example, apply a weighing function onto the audio information AI in order to, e.g., enhance and/or attenuate parts of the audio information A, particularly such that their respective importance for and impact on the generation of kinesthetic force feedback is taken into account.

The output of the mixing 38 is communicated to the control unit 30, which generates mixed vibro-tactile and kinesthetic force feedback control information. The mixed vibro-tactile and kinesthetic force feedback control information is used to control at least one actuator of the user interface device 20 such that the at least one actuator 46 acts on the steering wheel 22 (e.g. via a steering wheel shaft 48) such that the kinesthetic force feedback and the vibro-tactile force feedback is provided at the steering wheel.

In the case kinesthetic force feedback control information FFCI and vibro-tactile force feedback control information generated at the basis of audio information AI are to be mixed, the mixer 40 is located in or provided by the user interface device 20. In the case, at least one of the processing device 42 and the processing device 44 are also used, the processing device 42 and/or 44 can be located in or provided upstream the mixer 40 (e.g. in application device or a intermediate processing device) and the processing device 44 is located in or provided the user interface device 20.

The above observations with respect to the mixing 38, the mixer 40, the processing device 42 and the processing device 44 given above also apply here and, thus, are not repeated.

In the example of FIG. 7, mixing 38 is carried out "physically" by means of at least one actuator 50 for vibro-tactile force feedback and at least one actuator 52 for kinesthetic force feedback both acting on the steering wheel 22 via the steering wheel shaft 48.

In examples according to FIG. 7, optionally processing device 42 for processing kinesthetic force feedback control information FFCI and/or optionally processing device 44 for processing either, as explained below, audio information A or vibro-tactile force feedback control information VTFCI generated on the basis of audio information AT may be used. Due to the fact that according to FIG. 7 physical mixing is employed, the processing devices 42 and 44 may not part of the mixing (as illustrated). Apart from that, the above observations with respect to the processing means 42 and 44 also apply here and, thus are not repeated.

As indicated by the dashed rectangle around the processing device 42 and the processing device 44, they can be separate components or integrally provided by means of a common unit.

The example for FIG. 7 comprises a control unit 54 for the kinesthetic force feedback part and a control unit 56 for the vibro-tactile force feedback part.

As indicated by the dashed rectangle around the control unit 54 and the control unit 56, they can be separate components or integrally provided by means of a common unit (e.g. the control unit 30).

The control unit 54 generates kinesthetic force feedback control information, which is used to operate at least one actuator 52 for kinesthetic force feedback, and the control unit 56 generates vibro-tactile force feedback control information, which is used to operate the at least one actuator 50 for vibro-tactile force feedback. Since the actuators 50 and 52 act on the same steering wheel shaft, vibro-tactile and kinesthetic force feedback am commonly provided at the steering wheel 22.

As set forth at the beginning, different communication protocols for communication between an application device and a user interface device can be used. FIG. 8 illustrates an example, where different (e.g. two) communication protocols can be used. Particularly, it is included that one protocol (e.g. protocol A) ensures backward compatibility of the user interface device and that another protocol (e.g. protocol B) allows enhanced (faster) communication. In some examples, the user interface device 20 comprises two control units (e.g.

on the form of different chips), like the control units A and control unit B, one for protocol A and one for protocol B.

The user interface device 20 may comprise a hub or switch 58, which routes incoming information, according to the used protocol, to the respective control unit A or b. As hub, an USB hub, which automatically detects the used protocol, and as switch a "real" switch, which can be manually operated by a user, can be used.

As set forth at the beginning, the user interface device may comprise two motors cooperatively used to generate vibro-tactile force feedback. FIG. 9 illustrates an example for such cases with a steering wheel assembly, where two motor 1 and 2 act via gears 60 and 62 and a gear 64 onto a steering shaft 48 on a steering wheel in order generate forces/torques resulting in a vibro-tactile force feedback sensation at the steering wheel.

For reasons of clarity and ease of understanding in the specific case of a steering wheel having only rotational motion, the following descriptions refer to torque feedback, but these apply without restriction to the more general case of force feedback with linear (force) and/or rotational (torque) components.

Generally, it can be expected that the drive train between the motors and the steering wheel (here the gears 60, 62, 64) exhibits play due to tolerance and other mechanical deficiencies resulting in undesired effects at the steering wheel, e.g. cogging and backlash.

This may be resolved by operating the two motors 1 and 2 with a fixed or variable torque offset there between. For example, the torque offset may be controlled such that the torque provided by the at least two motors as a result of the torque offset preloads (biases) the drive train (e.g. gears) between the at least two motors and the location, where vibro-tactile force feedback is to be provided, in manner removing, e.g., mechanical play of/in the drive train.

Preferably, the torque offset provided by the at least two motors is controlled such that the resulting torque is null. In the case of two motors, this may be achieved by operating the two motors such that a first one of the two motors has a torque offset in a first rotational direction (this is $-torque_{preload}$ in FIG. 9) and a second one of the two motors has a torque offset in a second rotational direction being opposite to the first rotational direction (this is $+torque_{preload}$ in FIG. 9).

In other words, a torque offset may be fully applied by a first actuator in one direction and a second actuator in opposite direction, so that resulting force is null. This applies also to cases with more than two actuators, where the resulting force may be null also.

As described, applying a preload torque in opposite directions between two actuators allows to remove the perceived mechanical play (i.e. a force discontinuity) when the resulting output torque changes sign. In the following, solutions, particularly control schemes, to remove dynamic artefacts in the case of two actuators used to remove mechanical play are presented.

It is to be noted that mechanical play can occur in different types of mechanical transmissions between an actuator and an output. The exemplary case of toothed gears is presented for clarity, but the described solutions apply without restriction to any type of mechanical transmission affected by mechanical play in the transmission of linear and/or rotational movements (i.e. forces and/or torques).

FIG. 10a illustrates the torques for actuators (motors) 1 and 2 on the vertical axis required to achieve the desired resulting output torque on the horizontal axis. For clarity, both actuators are considered to have identical maximum and minimum output torques, but this is not necessary for the control scheme to apply. In the two points indicated where each one of the actuators torques crosses the horizontal (null torque) axis there is an internal relative gear motion between the actuator gear and the output gear since there is a transition of contact surface from one gear's tooth side to the adjacent one. While this internal gear motion may only be barely perceptible during slow transitions of the actuator torque through a sign change, there can be a perceptually disturbing dynamic "artefact" during faster transitions. The effect of mechanical percussion during the transition from one tooth side to the adjacent one at actuator torque sign change increases with the amount of mechanical play in the gears. This dynamic effect can interfere with the rendering of vibro-tactile force feedback information and have non-linear behavior with frequency and amplitude. Increasing the preload torque increases the resulting output torque range, which is free from these dynamic artefacts, but it also increases internal friction and reduces the amount of useful vibro-tactile force feedback information conveyed to the user.

FIG. 10b shows a refined control scheme resulting in a wider resulting torque range free from dynamic artefacts without the need to increase the internal preload torque. In the proposed control scheme, essentially only one first actuator contributes to generating the resulting output torque, the second other actuator providing only the preload torque. For resulting torques higher than the maximum torque of the main contributing actuator, the second actuator contributes the remaining portion of the torque. For output torques in opposite direction, the roles of first and second actuators is switched. In the case of two actuators of identical maximum and minimum output torques as shown in FIG. 10b, the resulting output torque range, which is free from dynamic artefacts, equals half of the maximum resulting output torque, independently of the selected internal preload torque.

In the following, solutions, particularly filtering techniques, solve problems of limitations with respect to the actuator output.

An actuator, or an arrangement of two or more actuators may provide, as output, torque and/or force and/or vibration. The following refers, only for illustration, to an actuator providing, as output, torque. However, the observations in this respect correspondingly apply to actuators providing, as output, force and/or vibration in addition to torque or as alternative.

Generally, an actuator may provide its output up to certain levels or threshold. Such output limitation may result from, for example, characteristics of the actuator, like saturation, its size, magnets, wiring, maximal current, maximum dissipated power, static behavior, dynamic behavior, and/or external factors, like temperature and humidity of the environment, as well as thermal resistance to this environment which affects the evolution of the actuator's temperature in time, as well as characteristics of the associated control unit.

For example, one or more of the following actuator output limitations may be present:
Static maximal actuator output (e.g. the maximal output torque the actuator may provide constantly, for a longer period of time)
Dynamic or instantaneous maximal actuator output (e.g. the maximal output torque the actuator may provide dynamically, instantaneously, for a short period of time)

Periodic maximal actuator output, for example, for a given duty cycle (e.g. the maximal output torque the actuator may provide in periodic manner)

Time varying maximal actuator output taking into account operating characteristics of the actuator and/or of its control unit (e.g. thermal requirements to prevent failure or reduced operating life-time)

As a result, it is possible that a desired actuator output (e.g. the torques an actuator should provide) cannot be provided by an actuator, because the actuator output is limited such that only actuator output being smaller than the desired can be provided.

With respect to the present disclosure, kinesthetic and vibro-tactile force feedback is considered with a view on actuator output limitation.

FIGS. 11 to 17 illustrate examples where an actuator provides, as output, torque and has a constant actuator output limitation in form of a constant maximal output torque (indicated by the dashed horizontal line). As mentioned above, actuator output may comprise, in addition or as alternative, force and/or vibration. Also, the maximal actuator output may be not constant, but may be varying in time, as illustrated in the example of FIGS. 18 to 19.

FIG. 11 illustrates an example where the shown desired kinesthetic torque output signal is applied to the actuator. In other words, the desired kinesthetic torque output signal indicates the torque that should be provided as kinesthetic force feedback or kinesthetic torque.

However, due to the actuator output limitation, the actuator cannot provide the desired kinesthetic torque (kinesthetic force feedback), but the actual kinesthetic torque (kinesthetic force feedback) shown in FIG. 12. As illustrated, the actuator output limitation results in clipping of the output torque.

FIG. 13 illustrates an example where the shown desired vibro-tactile torque output signal is applied to the actuator. In other words, the desired vibro-tactile torque output signal indicates the torque that should be provided as vibro-tactile force feedback or vibro-tactile torque.

Also, in this case, the actuator output limitation is present. However, since the desired vibro-tactile torque output signal does not exceed the actuator output limitation, the actuator can provide the desired vibro-tactile torque as actual vibro-tactile torque. In other words, the desired and actual vibro-tactile torque correspond.

However, since both a desired kinesthetic force feedback signal (e.g. kinesthetic force torque signal) and a desired vibro-tactile force feedback signal (e.g. vibro-tactile torque signal) are used in combination (see e.g. FIG. 6), the effect of actuator output limitation with respect to both signals may be taken into account.

Human beings are more sensitive to frequency changes and, in comparison, less sensitive to force direction and force magnitude. Vibro-tactile force feedback has higher frequencies as kinesthetic force feedback. Thus, a user will be more sensitive to vibro-tactile force feedback than to kinesthetic force feedback. Starting therefrom, the following can be said. If both kinesthetic force feedback and vibro-tactile force feedback can be provided as desired without being affected by actuator output limitation, the user can be provided with unaltered force feedback in both respects.

However, if actuator output limitation does not allow that that both a desired kinesthetic force feedback signal (e.g. kinesthetic torque signal) and a desired vibro-tactile force feedback signal (e.g. vibro-tactile torque signal) result in corresponding actual actuator kinesthetic and vibro-tactile force feedback outputs, it may be preferred to provide an unaltered vibro-tactile force feedback. For example, when both desired kinesthetic and vibro-tactile force feedback signals are combined and when the desired kinesthetic force feedback signal alone is affected by the actuator limitation (i.e. does not result in corresponding actual kinesthetic force feedback output, but is, e.g., clipped), the desired vibro-tactile force feedback signal may be, at least partially, lost and may, at least partially, not result in an actual vibro-tactile force feedback output, no vibro-tactile force feedback is provided to the user. This creates a discontinuity in the perceived vibro-tactile force feedback.

This is illustrated in FIG. 13 showing a desired combined kinesthetic and vibro-tactile force feedback signals (kinesthetic and vibro-tactile torque signals), which combination being clipped due to actuator output limitation (here the maximum output torque of the actuator). The latter is designated in FIG. 13 as "portion of the desired combined kinesthetic and vibro-tactile torque signals that cannot be provided by the actuator" and marked with stripes. The actually provided kinesthetic and vibro-tactile force feedback is illustrated in FIG. 15, where a part of the combined kinesthetic and vibro-tactile force feedback signal is lost.

It is that, due to its non-linear nature, hard-limited clipping of a desired torque signal may not only reduce the actual torque signal's amplitude, but may merely add undesired and potentially disturbing high frequency spectral content to the actual torque signal that was not present in the original unclipped signal.

Since humans are more sensitive to frequency changes and are relatively less sensitive to force direction and force magnitude, it is preferred to "give up" kinesthetic force feedback and to provide unaltered vibro-tactile force feedback. To this end, it is preferred to modify a desired kinesthetic force feedback signal such that resulting desired combined kinesthetic and vibro-tactile force feedback signals are not affected (or less effected) by actuator output limitation.

Such a modification can take place, for example, at the processing device 42 of FIG. 6 by modifying kinesthetic force feedback control information FFCI. Such a modification may, in addition or as alternative, take place at, for example, the mixer 40 and/or the control unit 30 of FIG. 6. In embodiments in line with FIG. 7, such a modification may take, for example, place at processing device 42 and/or control unit 54.

Such a modification may include at least one of the following, in the time domain and/or the frequency domain:
scaling
pitching,
frequency shifting,
filtering,
bandwidth limiting,
equalizing,
truncating,
compressing,
delaying,
convoluting FIG. 16 illustrates an exemplary modification of the desired kinesthetic force feedback signal of FIG. 11. In this example, the desired kinesthetic force feedback signal is modified in a range (time period), where the desired combined kinesthetic and vibro-tactile force feedback signals would be affected by actuator output limitation (e.g. clipped in FIG. 15). The modification is carried out such that, in said range, the desired kinesthetic force feedback signal is limited (e.g. by compression of the desired signal's amplitude) to level which in combination with the desired vibro-tactile force feedback signal result in a desired combined kinesthetic and vibro-tactile force feedback signals below the actuator output limitation. The latter is illustrated in FIG. 17.

As noted above, an actuator output limitation may be not constant. An exemplary actuator output limitation being variable is illustrated in FIG. 18. As shown, following the time line, the actuator output limitation has a certain level and, then, is reduced to a lower level. For example, in the case of actuator output in the form of torque, the maximum output torque of the actuator starts with a certain level and, then, is reduced to lower level. An example for such a varying actuator output limitation may be thermal actuator control. For example, the actuator is operated with the higher actuator output limitation of FIG. 18 and, for example in order to avoid damaging, excessive actuator temperatures, a thermal control mechanism reduces the actuator output limitation to levels where temperature is reduced, not further increased and/or maintained.

FIG. 18 also illustrates desired combined kinesthetic and vibro-tactile force feedback signals, which are affected by actuator output limitation in the range with reduced actuator output limitation levels. In FIG. 18, this part of the desired combined kinesthetic and vibro-tactil force feedback signals is designated as "portion of the combined kinesthetic and vibro-tactile torque signal that cannot be provided by the actuator" and marked by stripes. The actually provided kinesthetic and vibro-tactile force feedback is illustrated in FIG. 19, where a part of the combined kinesthetic and vibro-tactile force feedback signal is lost.

Generally, a modification of a kinesthetic force feedback signal may by such that it follows an actuator output limitation (or its levels). For example, a kinesthetic force feedback signal may be modified such that the resulting modified kinesthetic force feedback signal has a certain distance from the respective actuator output limitation (e.g. designated as "margin" in FIG. 16).

For the examples illustrated above in FIGS. 11 to 19, a design goal may be to keep desired vibro-tactile force feedback signals unaltered in the resulting combined actual kinesthetic and vibro-tactile force feedback provided to the user. In some cases, it may be preferable to also or only modify the vibro-tactile force feedback signals to prevent excessive loss of desired kinesthetic force feedback content in the resulting actual kinesthetic and vibro-tactile force feedback provided to the user.

In the following, solutions to mitigate vibro-tactile force artefacts (e.g. signal dropouts, jittering, clipping) are presented.

Human sensitivity to vibro-tactile force feedback is greatly affected by artefacts that affect the signal periodicity and regular delivery to the user. This differs from sensitivity to kinesthetic force feedback, which is affected by delays between the moment the user's movement is sensed and the moment the corresponding kinesthetic force feedback reaction is applied by the force feedback device. The vibro-tactile artefacts that may be avoided include, for example, the following:

Dropouts

Dropouts may occur when the vibro-tactile force feedback is temporarily interrupted. Even brief dropouts may have a significant impact on the realism of the vibro-tactile force feedback perceived by the user. Dropouts are a consequence of the audio and/or acoustic information being delayed and/or interrupted prior to being delivered to the haptic device.

Jitter

Jitter may occur when the vibro-tactile force feedback is applied to the user by the force feedback device in a non-periodic fashion. This may affect the perceived frequency content by the user's mechanoreceptors, resulting in a vibro-tactile feedback that differs from the feedback intended by the application. Jitter may occur when the delivery mechanism used by the force feedback device to apply the requested vibro-tactile force feedback values to the actuator is not given enough priority to guarantee periodic, uninterrupted delivery of the vibro-tactile content. Jitter may also occur when the force feedback device internal timing reference (clock) does not match the timing reference of the application device. As a consequence of this time base discrepancy between force feedback device and application device, the force feedback device may either deliver vibro-tactile samples slightly slower than intended (resulting in increasing delay in vibro-tactile force feedback delivery, which is not desirable), or slightly faster than intended (resulting in periodically skipped vibro-tactile data which will appear as jitter to the user).

Clipping

Clipping may occur when the amplitude of the vibro-tactile force feedback exceeds the output range of the force feedback device actuator (see e.g. discussion above). This may change the content in the frequency domain of the signal delivered to the user, what may result in an actual vibro-tactile feedback for the user that differs from the desired force feedback that the user should sense. Clipping may occur when the vibro-tactile signal processing logic does not correctly take into account the combined output of all force feedback sources that are driving the actuator, causing the resulting, combined output to exceed the maximum available output that the actuator can produce.

The proposed invention combines different techniques to mitigate the shortcomings of the data transmission of the vibro-tactile data, as well as to take into account and mitigate the difference in time base between the force feedback device and the application device, in order to maintain a periodic, jitter free and dropout free vibro-tactile force feedback experience. The techniques used may involve at least one of, for example, the following:

Buffering

Buffering includes storing a number of vibro-tactile force feedback samples to be applied by the force feedback device prior to starting the periodic delivery of those samples by the force feedback device. This enables the force feedback device to absorb (at least partially) temporary delay in transmission of audio and/or acoustic information from the application. The size of the buffer may depend on a combination of the nature of both the vibro-tactile and kinesthetic force feedback generated, as well as on the reliability of the audio and/or acoustic delivery.

In some embodiments, buffering may be accomplished by buffering of at least a part of the audio and/or acoustic information.

Content generation,

Content generation allows the force feedback device control software to automatically generate artificial, replacement samples to fill missing vibro-tactile data without breaking the illusion on continuous vibro-tactile force feedback by the user. Content generation can be used when the application fails to deliver a portion of the vibro-tactile force feedback data, and/or if the delay in vibro-tactile samples delivery is greater than can be absorbed by the buffer. Content generation may involve generating samples to continuously transition to delivery of vibro-tactile samples once data transmission resumes.

In some embodiments, content generation may be accomplished by content generation of artificial, continuity-maintaining audio and/or acoustic information.

Resampling

Resampling allows the force feedback device to apply the vibro-tactile samples expressed in the application time base. This can be achieved by letting the application monitor the behavior of the force feedback device to infer the skew of its internal clock relative to the application clock, and resample the audio and/or acoustic data sent to the force feedback device to guarantee that vibro-tactile samples are applied with the correct value in the application time base. Resampling allows the application to precisely control the delay in applying vibro-tactile content to the user.

In some embodiments, resampling may be accomplished by resampling of audio and/or acoustic information.

Resampling modulation

Resampling modulation allows the application to (slightly) alter the resampling rate (preferably below the human perceived frequency change threshold) in order to maintain a desired number of buffered vibro-tactile samples. This may allow the application to mitigate any discretization in clock skews between force feedback device clock and application clock. This mechanism may also allow a buffering algorithm to replenish its store of buffered vibro-tactile samples after a permanent delay occurs in audio and/or acoustic data transmission, and/or to reduce the number of buffered samples if the buffer becomes close to being full.

In some embodiments, resampling may be accomplished by modulation of a resampling rate to buffer a desired number of audio and/or acoustic information.

Further, in embodiments employing steering wheels, two steering wheels may be operatively coupled to a computer where a first steering wheel is controlled by a teacher and the second steering wheel is controlled by a student.

The first steering wheel that takes control of the car is defined as the master. The second steering wheel is defined as the slave. However, there may by more than two steering wheels wherein one is the master and the others are slaves.

The position information of the master steering wheel is continuously sent back to the computer to control the vehicle's behavior in the game simulation.

The kinesthetic force feedback computed by the game is sent back to the master steering wheel. However, the vibro-tactile force feedback coming from the game simulation is sent to all steering wheels so that all drivers can perceive the engine noises and other vibrations coming from the car and its environment.

In order for the slave steering wheels to be able to perceive and to correct motions from the master steering wheel, a virtual spring is modelled between the position of the master steering wheel and the position of the slave steering wheel. The resulting forces are applied as kinesthetic feedback forces to both steering wheels creating a virtual coupling between them.

Xm: angular position of the master steering wheel
Xs: angular position of the slave steering wheel.
Km; virtual spring stiffness perceived by the master steering wheel
Ks; virtual spring stiffness perceived by the slave steering wheel
Fm: kinesthetic spring force perceived by the master steering wheel
Fs: kinesthetic spring force perceived by the slave steering wheel $Fm = Km*(Xs-Xm)$
$Fs = Ks*(Xm-Xs)$ The computed kinesthetic spring force Fs is applied to the slave steering wheel.

The computed kinesthetic spring force Fm is applied to the master steering wheel in addition to the kinesthetic force computed by the game.

Different stiffness parameters Km and Ks can be adjusted to increase or decrease the perceived coupling. If Km is set to zero and if Ks is set to a high stiffness value, then the slave driver will perceive what the master driver is doing but will have no influence on him. If both Km and Ks are set to high stiffness values, then both drivers will be able to act on the vehicle and will perceive each other's interactions in a symmetrical way.

Such embodiments may be implemented between two players sitting side by side or between two remote players connected together (e.g. through the internet, though one or more wired or wireless connections).

In further such embodiments, one or more slaves am connected to a computer which streams a prerecorded race for which the positions of the master steering wheel driver have been recorded. In such embodiments, the slave drivers would be able to experience a race previously recorded.

The invention claimed is:

1. A method of providing vibro-tactile and kinesthetic force feedback to a user of a user interface device comprising at least one actuator adapted to provide vibro-tactile force feedback and kinesthetic force feedback to the user and communicatively coupled to an application device, the method comprising:
    (a) obtaining acoustic information from the application device;
    (b) generating vibro-tactile force feedback control information on the basis of the obtained acoustic information, the vibro-tactile force feedback control information defining at least one vibro-tactile force feedback to be provided to the user;
    (c) obtaining kinesthetic force feedback control information from the application device, the kinesthetic force feedback control information defining at least one kinesthetic force feedback to be provided to the user;
    (d) mixing the vibro-tactile force feedback control information and the kinesthetic force feedback control information to generate mixed vibro-tactile and kinesthetic force feedback control information, the mixed vibro-tactile and kinesthetic force feedback control information defining at least one vibro-tactile force feedback to be outputted to the user and at least one kinesthetic force feedback to be outputted to the user, wherein at least one of the vibro-tactile force feedback control information and the kinesthetic force feedback control information is modified before the mixing step such that the mixed vibro-tactile and kinesthetic force feedback control information does not exceed an output limitation of the at least one actuator; and
    (e) controlling the at least one actuator of the user interface device in dependence of the mixed vibro-tactile and kinesthetic force feedback control information to generate both at least one vibro-tactile force feedback for the user and at least one kinesthetic force feedback for the user.

2. The method according to claim 1, wherein the output limitation of the at least one actuator is at least one of:
- a static maximal actuator output that the at least one actuator may provide for a period,
- a dynamic or instantaneous maximal actuator output that the at least one actuator may provide dynamically or instantaneously,
- a periodic maximal actuator output that the at least one actuator may provide in periodic manner, and
- a time varying maximal actuator output that the at least one actuator may provide in time varying manner.

3. The method according to claim 1, wherein at least one of the kinesthetic force feedback control information, vibro-tactile force feedback control information, and the mixed kinesthetic and vibro-tactile force feedback information is modified, at least partially, by at least one of:
- scaling,
- pitching,
- frequency shifting,
- filtering,
- bandwidth limiting,
- equalizing,
- truncating,
- compressing,
- delaying,
- convoluting.

4. The method according to claim 1, wherein the generating of vibro-tactile force feedback control information comprises at least one of:
- scaling at least a part of the acoustic information,
- pitching at least a part of the acoustic information,
- frequency shifting at least a part of the acoustic information,
- filtering at least a part of the acoustic information,
- bandwidth limiting at least a part of the acoustic information,
- equalizing at least a part of the acoustic information,
- truncating at least a part of the acoustic information,
- compressing at least a part of the acoustic information,
- delaying at least a part of the acoustic information,
- convoluting at least a part of the acoustic information
- buffering of at least a part of the acoustic information,
- content generation of artificial, continuity-maintaining acoustic information,
- resampling of acoustic information,
- modulation of a resampling rate to buffer a desired number of acoustic information samples,
- encrypting acoustic information,
- packetizing acoustic information.

5. The method according to claim 1, wherein the acoustic information comprises acoustic information from at least two different acoustic information sources, wherein the obtaining of the acoustic information comprises at least one of selecting acoustic information from the at least two different acoustic information sources, preprocessing acoustic information from the at least two different acoustic information sources and mixing acoustic information from the at least two different acoustic information sources.

6. The method according to claim 1, wherein the at least one actuator comprises two motors, wherein the controlling the at least one actuator comprises operating the two motors with a fixed or variable torque offset there between, wherein the torque offset is preferably controlled such that a first one of the two motors provides the torque offset in a first rotational direction and a second one of the two motors provides the torque offset in a second rotational direction being opposite to the first rotational direction.

7. A vibro-tactile and kinesthetic force feedback providing device for providing vibro-tactile and kinesthetic force feedback to a user of a user interface device comprising at least one actuator adapted to provide vibro-tactile force feedback and kinesthetic force feedback to the user, the device comprising:
(a) a control unit;
(b) a mixer;
(c) a processing device for processing acoustic information;
(d) a processing device for processing kinesthetic force feedback control information;
(e) an input communicatively coupled to the processing device for processing acoustic information and being adapted for obtaining acoustic information from an application device and providing the obtained acoustic information to the processing device for processing acoustic information; and
(f) an input communicatively coupled to the processing device for processing kinesthetic force feedback control information and being adapted for obtaining kinesthetic force feedback control information from the application device and providing the obtained kinesthetic force feedback control information to the processing device for processing kinesthetic force feedback control information, wherein the processing device for processing acoustic information is adapted to process the obtained acoustic information to generate vibro-tactile force feedback control information, the vibro-tactile force feedback control information defining at least one vibro-tactile force feedback to be outputted to the user, the processing device for processing kinesthetic force feedback control information is adapted to process the obtained kinesthetic force feedback control information, the mixer is adapted to mix the generated vibro-tactile force feedback control information from the processing device for processing acoustic information and the processed obtained kinesthetic force feedback control information from the processing device for processing kinesthetic force feedback control information and outputting mixed vibro-tactile and kinesthetic force feedback control information defining at least one vibro-tactile force feedback to be outputted to the user and at least one kinesthetic force feedback to be outputted to the user, wherein at least one of the processing device for processing acoustic information is adapted to modify the generated vibro-tactile force feedback control information and the processing device for processing kinesthetic force feedback control information is adapted to modify the obtained kinesthetic force feedback control information such that the mixed vibro-tactile and kinesthetic force feedback control information does not exceed an output limitation of the at least one actuator, and the control unit is adapted to control the at least one actuator of the user interface device in dependence of the mixed vibro-tactile and kinesthetic force feedback control information from the mixer to generate both at least one vibro-tactile force feedback for the user and at least one kinesthetic force feedback for the user.

8. The device according to claim 7, wherein the output limitation of the at least one actuator is at least one of
- a static maximal actuator output that the at least one actuator may provide for a period, a dynamic or instantaneous maximal actuator output that the at least one actuator may provide dynamically or instantaneously,
a periodic maximal actuator output that the at least one actuator may provide in periodic manner,
a time varying maximal actuator output the at least one actuator may provide in time varying manner.

9. The device according to claim 7, wherein the control unit is adapted to modify at least one of the kinesthetic force feedback control information, vibro-tactile force feedback control information, and the mixed kinesthetic and vibro-tactile force feedback information, at least partially, by at least one of the following:
scaling,
pitching,
frequency shifting,
filtering,
bandwidth limiting,
equalizing,
truncating,
compressing,
delaying,
convoluting.

10. The device according to claim 7, wherein the control unit is adapted to generate the vibro-tactile force feedback control information by at least one of:
scaling at least a part of the obtained acoustic information,
pitching at least a part of the obtained acoustic information,
frequency shifting at least a part of the obtained acoustic information,
filtering at least a part of the obtained acoustic information,
bandwidth limiting at least a part of the obtained acoustic information,
equalizing at least a part of the obtained acoustic information,
truncating at least a part of the obtained acoustic information,
compressing at least a part of the obtained acoustic information,
delaying at least a part of the obtained acoustic information,
convoluting at least a part of the obtained acoustic information,
buffering of at least a part of the acoustic information,
content generation of artificial, continuity-maintaining acoustic information,
resampling of acoustic information,
modulation of a resampling rate to buffer a desired number of acoustic information samples,
encrypting acoustic information,
packetizing acoustic information.

11. The device according to claim 7,
(a) wherein the input of the processing device for processing acoustic information is adapted to obtain or select acoustic information from at least two different acoustic information sources and to mix acoustic information from the at least two different acoustic information sources, wherein the mixed acoustic information is used to control the at least one actuator; and
(b) wherein the processing device for processing acoustic information is adapted to generate for each of the obtained acoustic information from at least two different acoustic information sources vibro-tactile force feedback control information, so that at least two vibro-tactile force feedback control information is generated, each thereof defining at least one vibro-tactile force feedback to be provided to the user.

12. A system, the system comprising:
(a) a device according to claim 7; and
(b) a user interface device comprising the at least one actuator adapted to provide vibro-tactile and kinesthetic force feedback to the user.

13. The system according to claim 12, wherein the at least one actuator comprises two motors, wherein the control unit is adapted to control the two motors with a fixed or variable torque offset there between, wherein the torque offset is preferably controlled such that a first one of the two motors provides the torque offset in a first rotational direction and a second one of the two motors provides the torque offset in a second rotational direction being opposite to the first rotational direction.

14. A computer-readable medium having a set of instructions executable on a computing device for providing vibro-tactile and kinesthetic force feedback to a user of a user interface device having at least one actuator adapted to provide vibro-tactile and kinesthetic force feedback to the user and communicatively coupled to an application device, wherein the executable instructions of the computer-readable medium comprise:
(a) obtaining acoustic information from the application device;
(b) generating vibro-tactile force feedback control information on the basis of the obtained acoustic information, the vibro-tactile force feedback control information defining at least one vibro-tactile force feedback to be provided to the user;
(c) obtaining kinesthetic force feedback control information from the application device, the kinesthetic force feedback control information defining at least one kinesthetic force feedback to be provided to the user;
(d) mixing the vibro-tactile force feedback control information and the kinesthetic force feedback control information generate mixed vibro-tactile and kinesthetic force feedback control information, the mixed vibro-tactile and kinesthetic force feedback control information defining at least one vibro-tactile force feedback to be outputted to the user and at least one kinesthetic force feedback to be outputted to the user, wherein at least one of the vibro-tactile force feedback control information and the kinesthetic force feedback control information is modified before the mixing step such that the mixed vibro-tactile and kinesthetic force feedback control information does not exceed an output limitation of the at least one actuator; and
(e) controlling the at least one actuator of the user interface device in dependence of the mixed vibro-tactile and kinesthetic force feedback control information to generate both at least one vibro-tactile force feedback for the user and at least one kinesthetic force feedback for the user.

15. The method according to claim 1, wherein
at least two user interface devices are communicatively coupled to the application device,
the at least one actuator is at least one actuator of a first user interface device of the at least two user interface devices,
the method further comprising
controlling at least one actuator of a second user interface device of the at least two user interface devices in dependence of the mixed vibro-tactile and kinesthetic force feedback control information for the first user interface device to generate both at least one vibro-tactile force feedback for a user of the second user interface device and at least one kinesthetic force feedback for the user of the second user interface device.

16. The method according to claim 15, wherein the mixed vibro-tactile and kinesthetic force feedback control information for the first user interface device is stored, and the at least one actuator of the second user interface device is controlled in dependence of the stored mixed vibro-tactile and kinesthetic force feedback control information.

17. The method according to claim 1, wherein the acoustic information is preprocessed.

* * * * *